United States Patent [19]
Nakanishi

[11] Patent Number: 5,887,186
[45] Date of Patent: Mar. 23, 1999

[54] METHOD OF SOLVING SIMULTANEOUS LINEAR EQUATIONS IN A MEMORY-DISTRIBUTED PARALLEL COMPUTER

[75] Inventor: Makoto Nakanishi, Kawasaki, Japan

[73] Assignee: Fujitsu Limited, Kawasaki, Japan

[21] Appl. No.: 412,308

[22] Filed: Mar. 29, 1995

[30] Foreign Application Priority Data

Mar. 31, 1994 [JP] Japan ................................ 6-062241

[51] Int. Cl.$^6$ ............................ G06F 15/324; G06F 9/44
[52] U.S. Cl. ................................ 395/800.28; 395/800.04
[58] Field of Search ........................ 395/500, 800.22, 395/800.28, 800.02, 800.04; 364/735, 736, 736.03, 736.04

[56] References Cited

U.S. PATENT DOCUMENTS

| | | | |
|---|---|---|---|
| 5,157,778 | 10/1992 | Bischoff et al. | 395/500 |
| 5,200,915 | 4/1993 | Hayami | 364/736.03 |
| 5,301,342 | 4/1994 | Scott | 395/800 |
| 5,392,249 | 2/1995 | Agrawal et al. | 364/735 |
| 5,442,569 | 8/1995 | Osano | 364/578 |
| 5,490,278 | 2/1996 | Mochizuki | 395/800 |
| 5,604,911 | 2/1997 | Ushiro | 364/578 |

OTHER PUBLICATIONS

Nakanishi et al., "A High Performance Linear Equation Solver on the VPP500 Parallel Supercomputer", Supercomputing '94, pp. 803–810, 1994.

Davidson, David B., "Large Parallel Processing Revisted: A Second Tutorial", IEEE Antennas and Propagation Magazine, V.34, No. 5, pp. 9–21, Oct. 1992.

Wang, Lixin and Mendel, J.M., "Structured Trainable Networks for Matrix Algebra", Neural Networks, 1990 IEEE International Conference, pp. 11—125–132, 1990.

Ibarra, Oscar H. and Kim, Myung Hee, "Fast Parallel Algorithms for Solving Triangular Systems of Linear Equations on the Hypercube", Parallel Processing, 1991 Symposium, pp. 76–83, 1991.

*Primary Examiner*—Tod R. Swann
*Assistant Examiner*—Christopher S. Chow
*Attorney, Agent, or Firm*—Staas & Halsey

[57] ABSTRACT

A simultaneous linear equations calculation method using a memory-distributed parallel processor and the memory-distributed parallel processor solves simultaneous linear equations in an LU decomposition method in block units using an outer product. According to the method and the processor, data of column vector blocks is rearranged through a cyclic and parallel rearrangement and transfer. When an LU decomposition is performed, data to be processed in a row matrix product is divided, and the divided data is processed in a matrix calculation and simultaneously transferred for a subsequent matrix product calculation. The LU-decomposed matrix is restored to an original arrangement and then rearranged such that the matrix is divided in the row vector direction to realize a forward/backward substitution process in parallel in each processor.

21 Claims, 24 Drawing Sheets

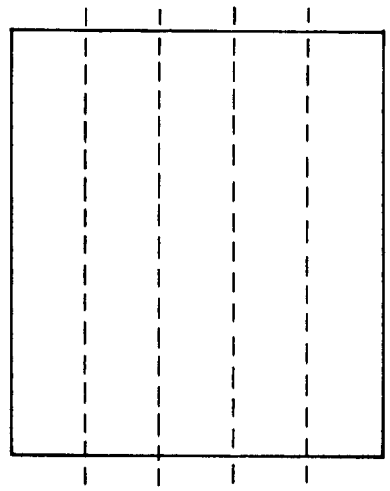 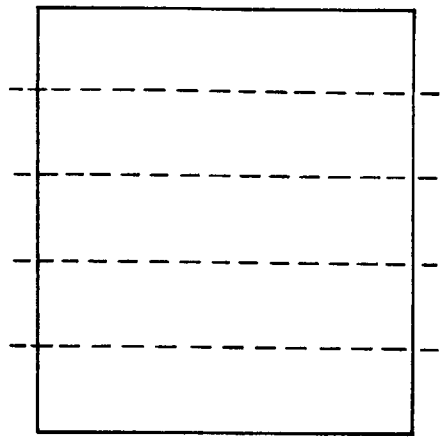
FIG. 12A  FIG. 12B
FIG. 13

METHOD OF SOLVING SIMULTANEOUS LINEAR EQUATIONS IN A MEMORY-DISTRIBUTED PARALLEL COMPUTER

BACKGROUND OF THE INVENTION

Field of the Invention

The present invention relates to a computer and method of a simultaneous linear equation solver using a memory-distributed parallel processor capable of quickly solving simultaneous linear equations in a multiprocessor system which performs its processes through communications among a plurality of processors.

A blocked LU decomposition method is followed using outer products as an algorithm of solving simultaneous linear equations for a parallel process. FIG. 1 shows the outline of the blocked LU decomposition method using the outer products.

Gaussian d indicates the width of a block. The following processes are performed in this method.

The k-th process updates update portion $A^{(k)}$ by the following equation.

$$A^{(k)} = A^{(k)} - L2^{(k)} \cdot U2^{(k)} \quad (1)$$

In the (k+1)th process, $A^{(k)}$ is divided by the block width d and a matrix smaller by d is updated by the same equation. $L2^{(k)}$ and $U2^{(k)}$ should be calculated by the following equation.

When equation (1) is used for update, data is decomposed as follows.

$$B^{(k)} = ((L1^{(k)})^T, (L2^{(k)})^T)^T U1^{(k)}$$

Then, the data is updated as follows.

$$U2^{(k)} = (L1^{(k)})^{-1} U2^{(k)}$$

where $L1^{(k)}$ indicates a lower triangular matrix after the LU decomposition, while $U1^{(k)}$ indicates an upper triangular matrix.

When the blocked LU decomposition method is followed in a memory-distributed parallel processor using outer products, data should be efficiently distributed to the memory of each processor and object data should be efficiently switched among the processors. Conventionally, blocked data is sequentially positioned in each processor to simplify user interface. Therefore, the LU decomposition load of each processor is not necessarily assigned equally. Furthermore, the parallelism of the data communications among the processors is inefficient, thereby undesirably increasing a communications cost.

Quickly solving simultaneous linear equations is an essential application of computers. To solve the equations more efficiently through a massively parallel processor requires not only a efficient method but also efficient parallelism incorporated into the characteristics of the massively parallel processor.

A high-performance CPU and a large-scale memory system are required to solve a large volume of simultaneous linear equations. To quickly solve the simultaneous linear equations using a memory-distributed multiprocessor, the data should be efficiently assigned and transmitted to the memory of each processor.

Additionally, the user interface (application interface of the host computer) should be implemented without a complicated configuration to solve various problems.

SUMMARY OF THE INVENTION

The present invention has an objective to shorten the time required to solve simultaneous linear equations by sharing a processing load among a plurality of processors.

In the method of solving simultaneous linear equations using the memory-distributed parallel processor according to the present invention which comprises a plurality of processors capable of mutually transferring data to solve simultaneous linear equations by the LU decomposition method in which a coefficient matrix is distributed to a plurality of processors, the coefficient matrix is distributed to each processor, decomposed into LU, and dynamically transferred in parallel to each processor such that the matrix can be cyclically rearranged in row-vector block units.

Each block distributed to a corresponding processor is LU-decomposed into LU and processed in a forward/backward assignment process on each of the LU decomposition results.

Since the LU decomposition of a coefficient matrix can be performed on each processor in parallel, the LU decomposition can be completed quickly and the data can be transferred in block units in parallel in a shortened data transfer time.

BRIEF DESCRIPTION OF THE DRAWINGS

FIG. 12 is a diagram showing an example of rearrangement in the forward/backward assignment process;

FIG. 13 is an explanatory view of the rearrangement in the forward/backward assignment process;

DESCRIPTION OF THE PREFERRED EMBODIMENTS

Figure 2:
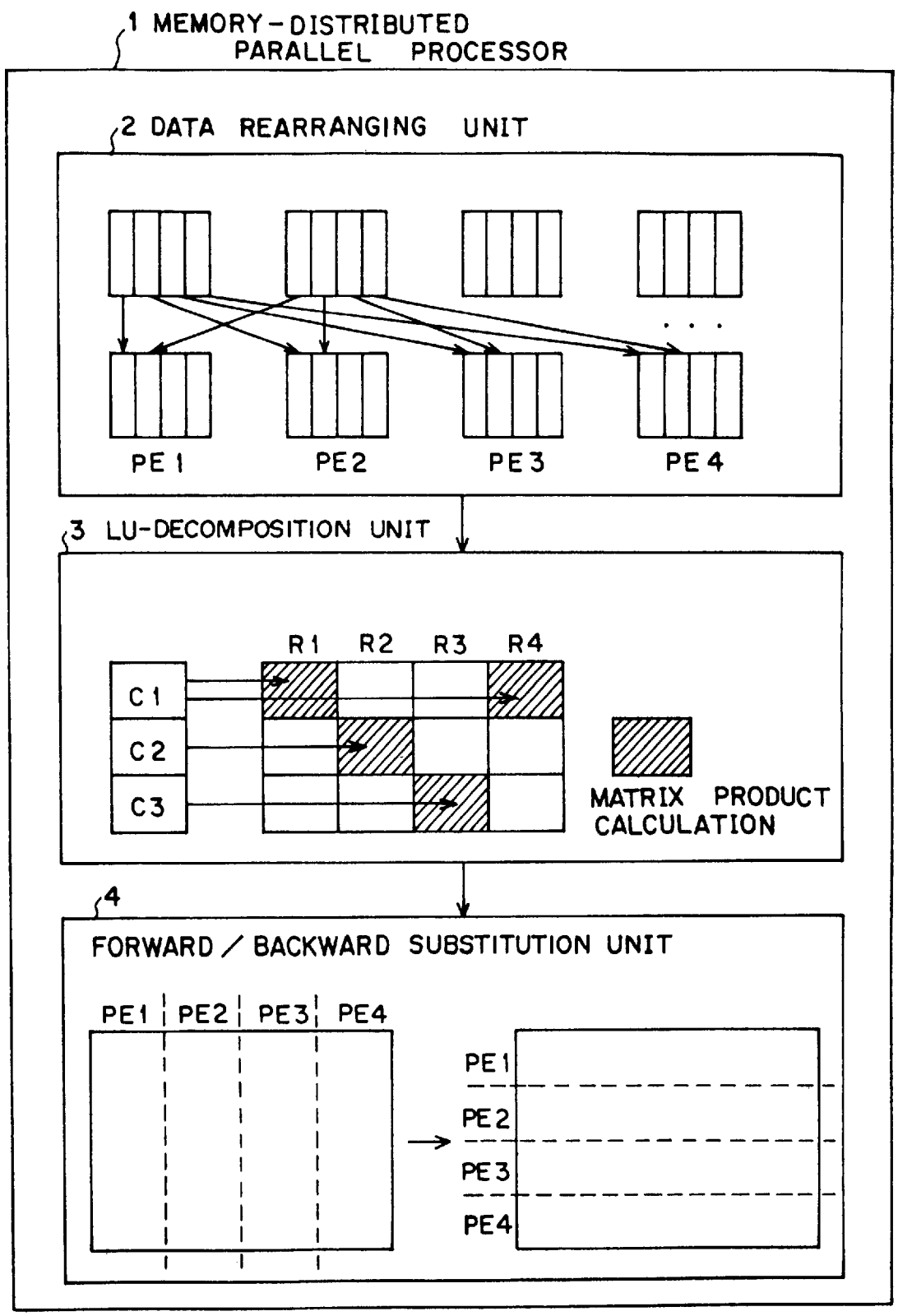
FIG. 2 is a diagram showing the principle of the present invention.

The embodiment of the present invention is described below by referring to the attached drawings. FIG. 2 shows the principle of the present invention. The Gaussian elimination performed in block units using the outer products is realized, as described below, as one of the solutions of simultaneous linear equations.

A memory-distributed parallel processor 1 comprises a plurality of processors. Any two processors can directly communicate with each other. A data rearranging unit 2 in the memory-distributed parallel processor 1 rearranges blocks of column vectors by distributing them to each processor PE. Concurrently transferring data required to the rearrangement enables a quick data transfer. The data rearranging unit 2 rearranges blocks by transferring the k-th block k in a plurality of column vector blocks in a matrix in each processor to the (mod (k−1, pe)+1)th processor. Furthermore, blocks are transferred to each processor in parallel.

An LU-decompositing unit 3 divides data to be processed in a matrix product calculation during the LU-decomposition of blocks, and then transfers the result to each processor. The divided data is calculated in each processor. The data to be processed in the next matrix product is transferred in parallel to each processor. Repeating these processes completes the entire calculation. In this case, the time actually required to transfer data can be reduced by shortening the initial transfer time and concurrently performing subsequent transfer and calculation with the actual transfer and calculation time overlapped.

A forward/backward substitution unit 4 restores the data rearranged in block units to the original arrangement, rearranges the data stored in each processor as divided in the column vector direction into the data stored as divided in the row vector direction to substitute LU decomposed data forward and backward to efficiently solve a given equation.

Rearranging the data through the transfer in parallel, as described above, allows the load charged in an LU-decomposition to be equally distributed to each processor, and also allows the data transfer time during the data rearrangement to be apparently equivalent to the communication time among the processors.

The embodiment of the present invention is described below by referring to the attached drawings.

Figure 3:
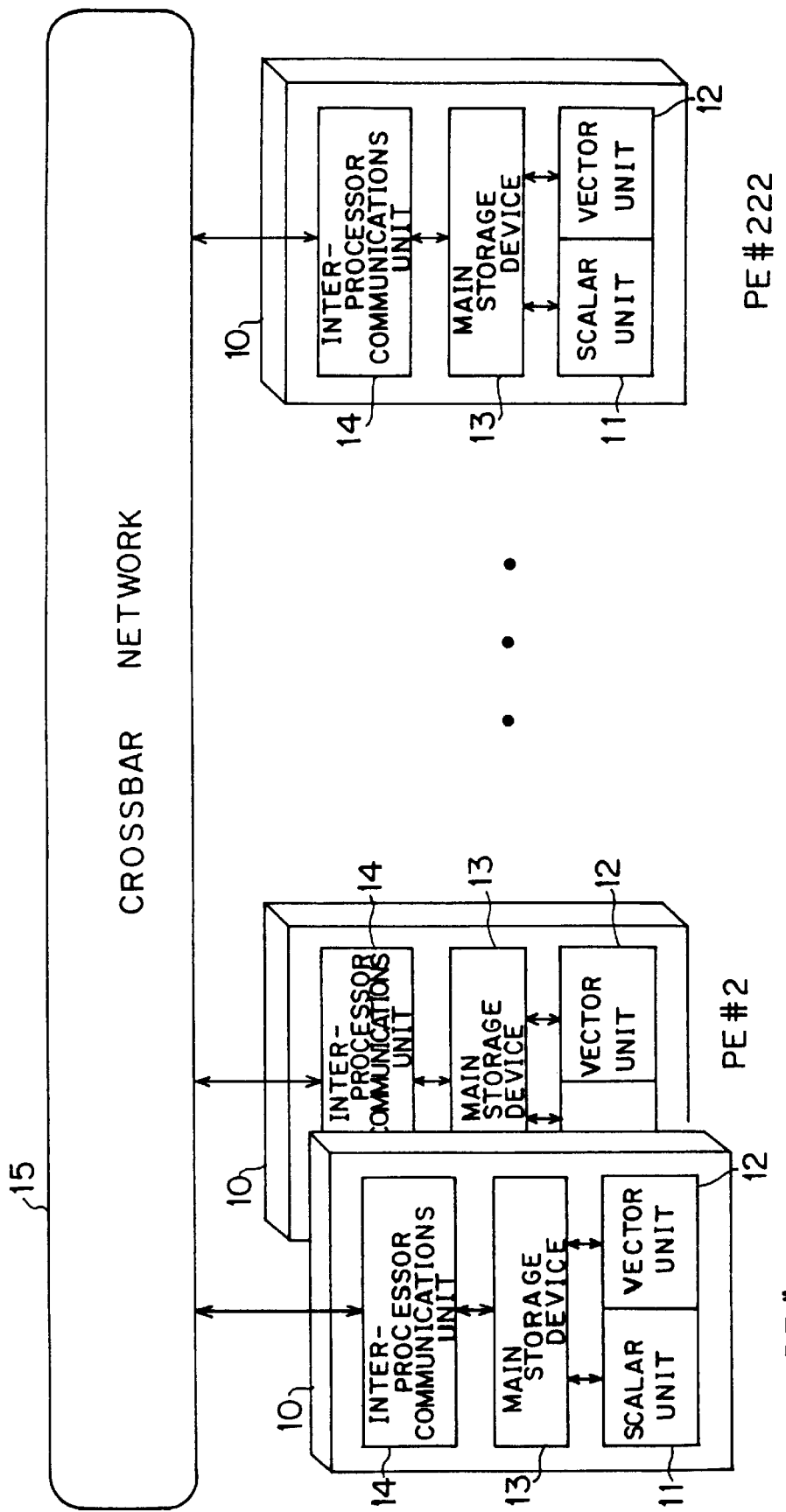
FIG. 3 is a block diagram of the configuration of the memory-distributed parallel processor according to an embodiment of the present invention.
Figure 4:
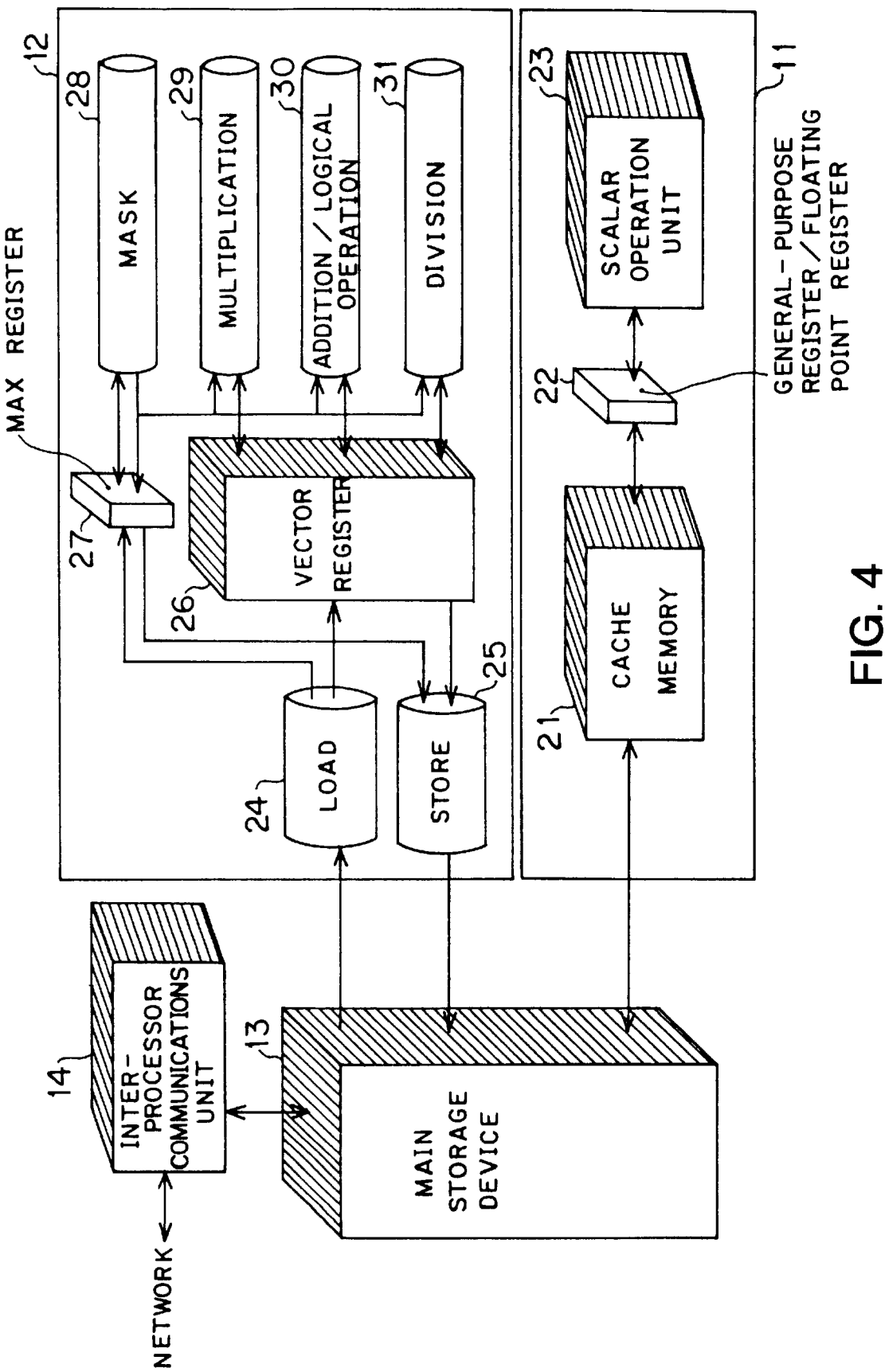
FIG. 4 is a block diagram of the configuration of the processor.

FIG. 3 shows the configuration of the memory-distributed parallel processor according to an embodiment of the present invention. FIG. 4 shows the configuration of the processor (PE) shown in FIG. 3.

The present invention can be realized by a memory distributed parallel processor having the hardware shown in, for example, FIG. 3. Each processor (PE) 10 is connected to a crossbar network 15 and comprises a scalar unit 11 for performing a scalar operation, a vector unit 12 for performing a vector operation, a main storage device 13 for storing instruction strings of a program and data to be processed in the operations, and a inter-processor communications unit 14 for communicating data through the crossbar network 15 to and from other processors.

Each processor 10 is designed as shown in FIG. 4. The scalar unit 11 comprises a cache memory 21 for temporarily holding the data in the main storage device 13, a general-purpose register/floating point register 22 for operations, a scalar operation unit 23 for executing a scalar instruction. If an instruction fetched from the main storage device 13 is a vector instruction, then the vector unit 12 is activated. The vector unit 12 comprises a load pipeline 24 for loading data from the main storage device 13, a store pipeline 25 for storing data in the main storage device 13, a vector register 26 for holding a series of data to be processed in a vector operation, a mask register 27 for masking specific data to be processed, a mask pipeline 28 for specifying data to be processed in the operations, a multiplication pipeline 29 for multiplying vector data, a addition/logical operation pipeline 30 for performing addition/substraction or a logical operation, and a division pipeline 31 for dividing vector data.

Described below in detail is the method of solving simultaneous linear equations according to the present invention.

[1] Dynamic Data Rearrangement

First, the method of dynamically rearranging data is explained.

In the memory-distributed parallel processor shown in FIG. 3, data is stored after being distributed. In a two-dimensional array, the data is divided into portions in the column direction and assigned to each processor (PE) 10. The matrix of the two-dimensional array is considered a collection of blocks having given width and the block are rearranged.

$$\begin{aligned} A(n, m) &= A(n, 1{:}d) + A(n, d+1{:}2d) + \\ & \quad A(n, 2d+1{:}3d) + \ldots \\ &= A1 + A2 + A3 + \ldots + Ak \\ \text{where } Aj &= A(n, (j-1)*d+1{:}j*d) \end{aligned}$$

The data is rearranged such that block Aj is assigned to a processor indicating mod (j−1,#pe)+1, where #pe indicates the number of processors (processor i (i=1, . . . , #pe)).

Block Aj is assigned to a processor indicating mod (j−1,#pe)+1, where mod (a,b) indicates a remainder of integer a divided by integer b.

Array B as large as array A is distributed and assigned to each processor. In the memory-distributed parallel processor shown in FIG. 3, each processor is connected to the crossbar network 15 for concurrent transmission. Data can be simultaneously read from and written to the same processor, thereby allowing the blocks to be rearranged in the sequence shown in FIG. 4.

Figure 5:
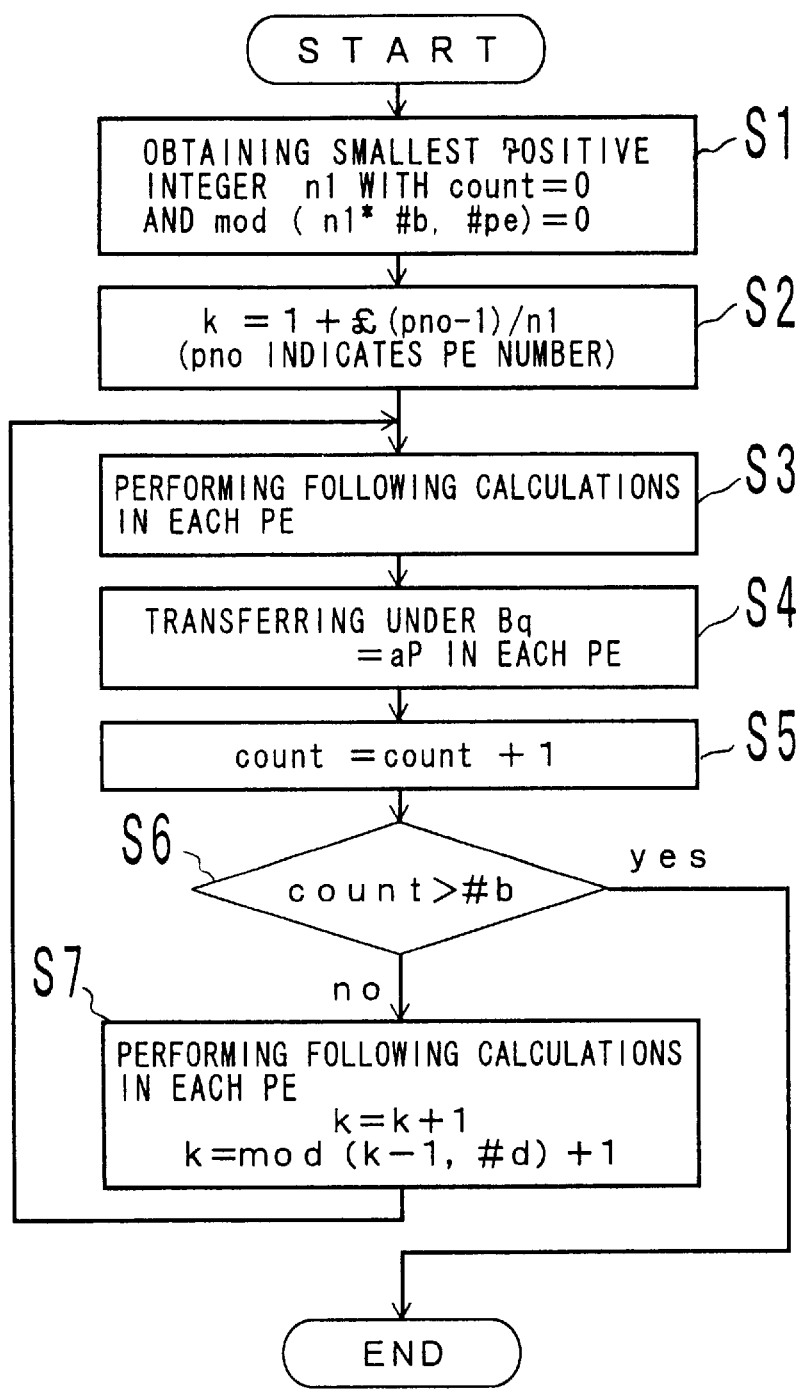
FIG. 5 is a flowchart of the rearrangement process according to an embodiment of the present invention.

FIG. 5 is a flowchart showing the process of rearranging blocks according to the embodiment of the present invention.

The same number of blocks Aj are arranged sequentially in each processor (PE). The blocks are arranged such that the total number jt of the blocks can be divisible by the number of processors #pe. The number #b of blocks in a processor equals jt/#pe.

In step S1 shown in FIG. 5 in the rearranging process, the minimum positive integer n1 that satisfies count =0 and mod (n1*#b,#pe)=0 is first obtained.

If the PE number of each processor is pno (pno=1, . . . , #pe) in step S2, then k=1+L (pno−1)/n1 in each PE. The L(pno−1)/n1 indicates an integer portion of an operation result of (pno−1)/n1.

In step S3, the following calculations are performed in each processor.

$$p=(pno-1)*\#b+k$$

$$p1=L(P-1)/\#pe$$

$$p2=mod(p-1, \#pe)$$

$$q=p2*\#b+p1+1$$

where p indicates a block number in array A in a transferred-from processor when blocks in array A comprising one or more column vectors are serially numbered from the first processor PE1, and q indicates a block number in array B in a transferred-to processor. In the process in step S3, obtained are the block number p in array A in the transfer-from processor when data are rearranged in block units and the block number q in array B in the transfer-to processor.

In step S4, the transmission Bq=Ap is conducted in each processor, where Ap indicates block P in the transferred-from matrix A, and is stored in each processor; and Bq indicates block q in the transferred-to matrix B, and is a processor different from one another, thereby transmitting data completely in parallel.

That is, since a plurality of reading operations or a plurality of writing operations are not performed on a single processor, that is, a single reading operation and a single writing operation are performed in a single processor, data can be transferred completely in parallel among the processors in rearranging blocks.

In step S5, count=count+1

In step S6, it is determined whether or not count>#b.

If count>#b, then the process terminates. Unless count>#b, then control is passed to step S7.

In step S7, the following calculation is made in each PE.

$$k=k+1$$

$$k=mod(k-1,\#b)+1$$

Then, control returns to step S3, and the processes are repeated.

Figure 6:
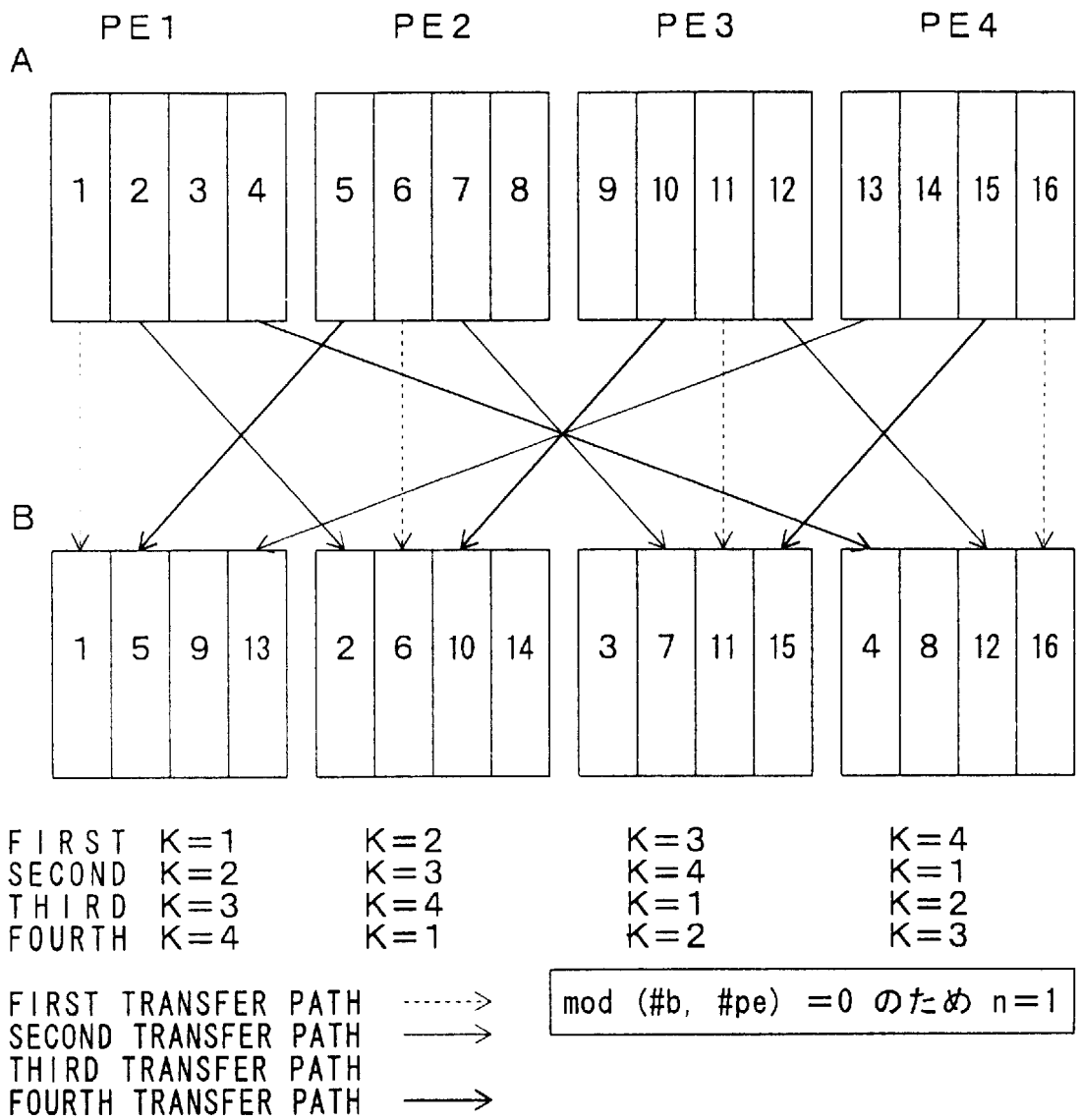
FIG. 6 is a diagram showing an example of the transfer of blocks.

An example of the above described rearranging process is described by referring to FIG. 6. FIG. 6 shows the case where the number of processors pe is 4, and the number of blocks b in a processor is 4. One rectangle in arrays A and B in FIG. 6 refers to one block, and a number in each block refers to a block number for explanatory use.

In this case, since the number of processors is PE=4, the number of blocks b=4, the minimum positive integer n1 satisfying mod(n1*b, pe)=0 is 1.

At the initial state, the value k of processor PE1 in the calculation in step S2 is represented by k=1+(1−1)/1=1. The value k of processor PE2 is represented by k=1+(2−1)/1=2. The value k of processor PE3 is represented by k=1+(3−1)/1=3. The value k of processor PE4 is represented by k=1+(4−1)/1 =4.

Calculated in the next step S3 are the block number p in array A of each transferred-from processor and the block number q in array B of a transferred-to processor. As a result, the transferred-from block number p and the transferred-to block number q are p=1 and q=1 in processor PE1, p=6 and q=6 in processor PE2, p=11 and q=11 in processor PE3, and p=16 and q=16 in processor PE4.

Therefore, in the first transfer path, the first block 1 in array A of processor PE1 is transferred to the first block position in array B of processor PE1. The second block 6 in array A of processor PE2 is transferred to the sixth, that is, the second block position in array B of processor PE2. The third block 11 in array A of processor PE3 is transferred to the 11th, that is, the third block position in array B of processor PE3. The fourth block 16 in array A of processor PE3 is transferred to the 16th, that is, the fourth block position in array B of processor PE4.

Then, in the second transfer path, k=2 (PE1), k=3 (PE2), k=4 (PE3), and k=1 (PE4). Calculated in the next step S3 are the block number p in array A of each transferred-from processor and the block number q in array B of a transferred-to processor. As a result, the transferred-from block number p and the transferred-to block number q are p=2 and q=5 in processor PE1, p=7 and q=10 in processor PE2, p=12 and q=15 in processor PE3, and p=13 and q=4 in processor PE4.

Therefore, in the second transfer path, the second block 2 in array A of processor PE1 is transferred to the fifth, that is, the first block position in array B of processor PE2. The third block 7 (7th) in array A of processor PE2 is transferred to the 10th, that is, the second block position in array B of processor PE3. The fourth block 12 (12th block) in array A of processor PE3 is transferred to the 15th, that is, the third block position in array B of processor PE4. The first block 13 (13th block) in array A of processor PE4 is transferred to the 4th, that is, the fourth block position in array B of processor PE1.

Likewise, in the third transfer path with k=3 (PE1), K=4 (PE2), k=1 (PE3), and k=2 (PE4), 3rd block 3 in array A of PE1 is transferred to the 1st position of array B of PE3, 4th block 8 in array A of PE2 is transferred to the 2nd position of array B of PE4, 1st block 9 in array A of PE3 is transferred to the 3rd position of array B in PE1, and 2nd block 14 in array A of PE4 is transferred to the 4th position of array B in PE2.

Likewise, in the third transfer path with k=3 (PE1), K=4 (PE2), k=1 (PE3), and k=2 (PE4), 4th block 4 in array A of PE1 is transferred to the 1st position of array B of PE4, 1st block 5 in array A of PE2 is transferred to the 2nd position of array B of PE1, 2nd block 10 in array A of PE3 is transferred to the 3rd position of array B in PE2, and 3rd block 15 in array A of PE4 is transferred to the 4th position of array B in PE3.

Data are transferred and rearranged as listed above. As a result, a plurality of data reading operations or a plurality of data writing operations can be prevented from being performed simultaneously in a PE. Furthermore, since a reading operation and a writing operation can be concurrently performed in the same PE, the data is concurrently transferred without a conflict or waiting in a queue.

[2] Efficient Method of Obtaining Matrix Product

Figure 1:
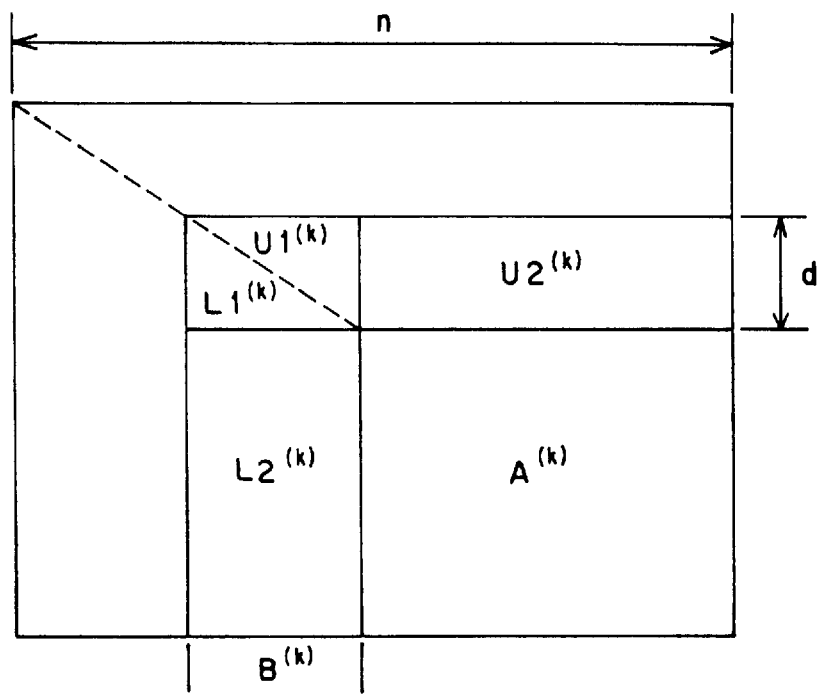
FIG. 1 is a diagram showing the LU decomposition method.
Figure 7:
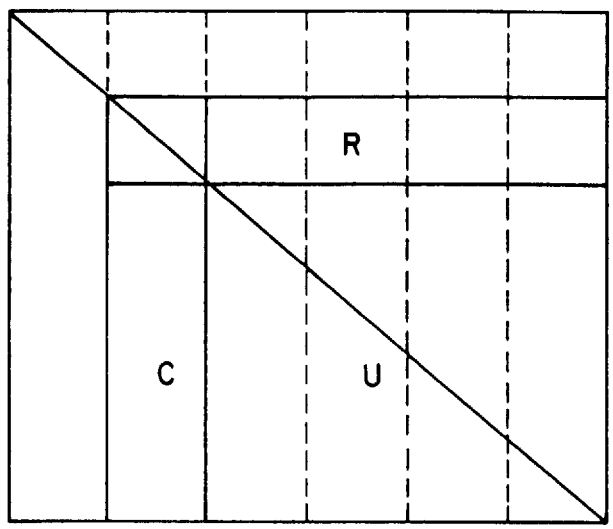
FIG. 7 is a diagram showing an example of the matrix to be LU-analyzed.

The above listed rearranged data is LU-decomposed in block units. FIG. 7 shows an example of a matrix to be LU-decomposed according to the embodiment of the present invention. As shown in FIG. 1, the LU decomposition is performed by the Gaussian elimination performed in block units using the outer products. The update portion U shown in FIG. 7 is calculated by U=U−C×R to update U.

The calculation requires matrix C to be transferred to each PE. An easier method is to transfer the entire matrix C to each PE. When a matrix product is calculated after transferring matrix C to each PE, the entire matrix C can be transferred to each PE through a binary tree method in the form of an exponent of 2. That is, data is transferred as follows when transferred from PE1 to other #pe−1 PEs.

1. Matrix C is transferred from PE1 to PE2.

2. Then, the transfer from PE1 to PE3 is performed concurrently with the transfer from PE2 to PE4.

3. Next, the transfer is concurrently performed from PE1 to PE5, from PE2 to PE6, from PE3 to PE7, and from PE4 to PE8. After the transfer, the entire transfer cost (time) is calculated in the order of LOG2 (#pe).

To reduce the entire transfer cost, matrix C is divided in the row direction as described below.

In the k-th stage in the LU decomposition in block units, the above described matrix product is calculated after the LU decomposition on Ak. At this time, matrix C is divided into n portions, and numbers them C1, C2, C3, . . . , Cn sequentially. n is determined to satisfy #pe/n>1 and LOG2 (#pe/n)<n.

Figure 8:
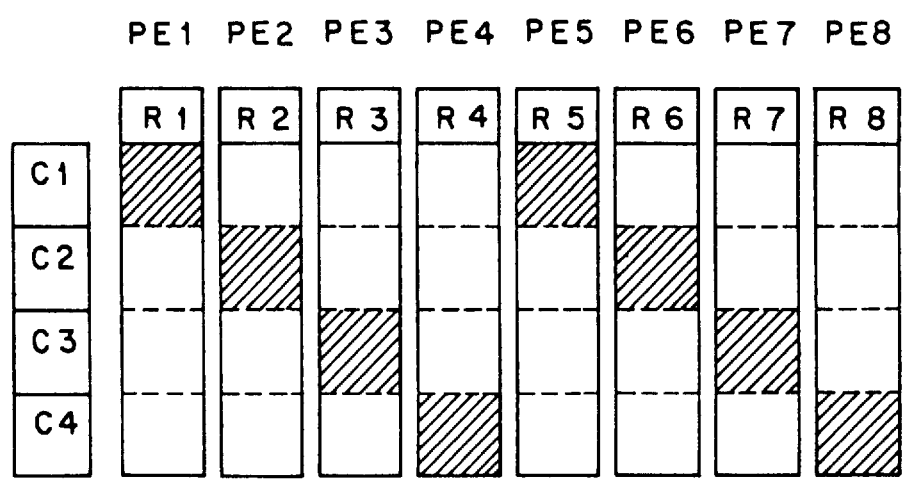
FIG. 8 is a diagram showing the calculation of a matrix product.

Described below is an example in which matrix C1 through C4 equally divided into 4 portions are calculated in 8 processors PE1 through PE8 as shown in FIG. 8. Assume that PE1 holds the data of block R1, PE2 holds the data in block R2, . . . , and PE8 holds the data in block R5. A partial update is performed using the matrix product of matrix R8 by matrix Cj in each PE. The hatched portions in FIG. 8 indicate the portions processed in the first update.

In calculating a matrix product of matrix Ri by matrix Cj in each PE, matrix Cj is sequentially shown from PE1 to PE8 as follows.

1st calculation: C1, C2, C3, C4, C1, C2, C3, C4

2nd calculation: C4, C1, C2, C3, C4, C1, C2, C3

3rd calculation: C3, C4, C1, C2, C3, C4, C1, C2

4rd calculation: C2, C3, C4, C1, C2, C3, C4, C1,

To perform the calculations, Ck should be transferred as follows.

A processor which stores block k in the first transfer is processor p=mod (k−1, #pe)+1. Matrix C is equally divided into n portions Ci, and Ci is transferred to mod (p−2+i, #pe)+1 from the processor p. At the second transfer, the data of n processors transferred in the first transfer is transferred in parallel to other processors. At the t-th transfer, 2**(t−1) *n (** indicates an exponent) is transferred in parallel. Ci is thus transferred to each processor.

Figure 9:
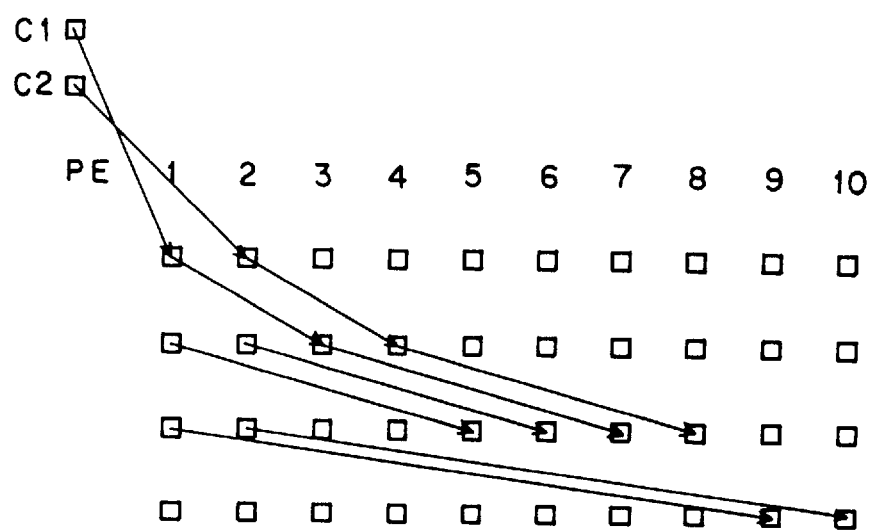
FIG. 9 is a diagram showing an example of the transfer in which matrix C exists in processor PE1.

FIG. 9 shows an example of the transfer in which matrix C is processed in PE1. As shown in FIG. 9, C1 is transferred to PE1 and C2 is transferred to PE2 in the first transfer. In the second transfer, C1 is transferred from PE1 to PE3 and C2 is transferred from PE2 to PE4 in parallel. In the next transfer, C1 is transferred from PE1 to PE5 and from PE3 to PE7, and C2 is transferred from PE2 to PE6 and from PE4 to PE8 in parallel.

The transfer and calculation can be performed simultaneously by transferring the data necessary in the second calculation to another area while the first calculation is performed.

Figure 10:
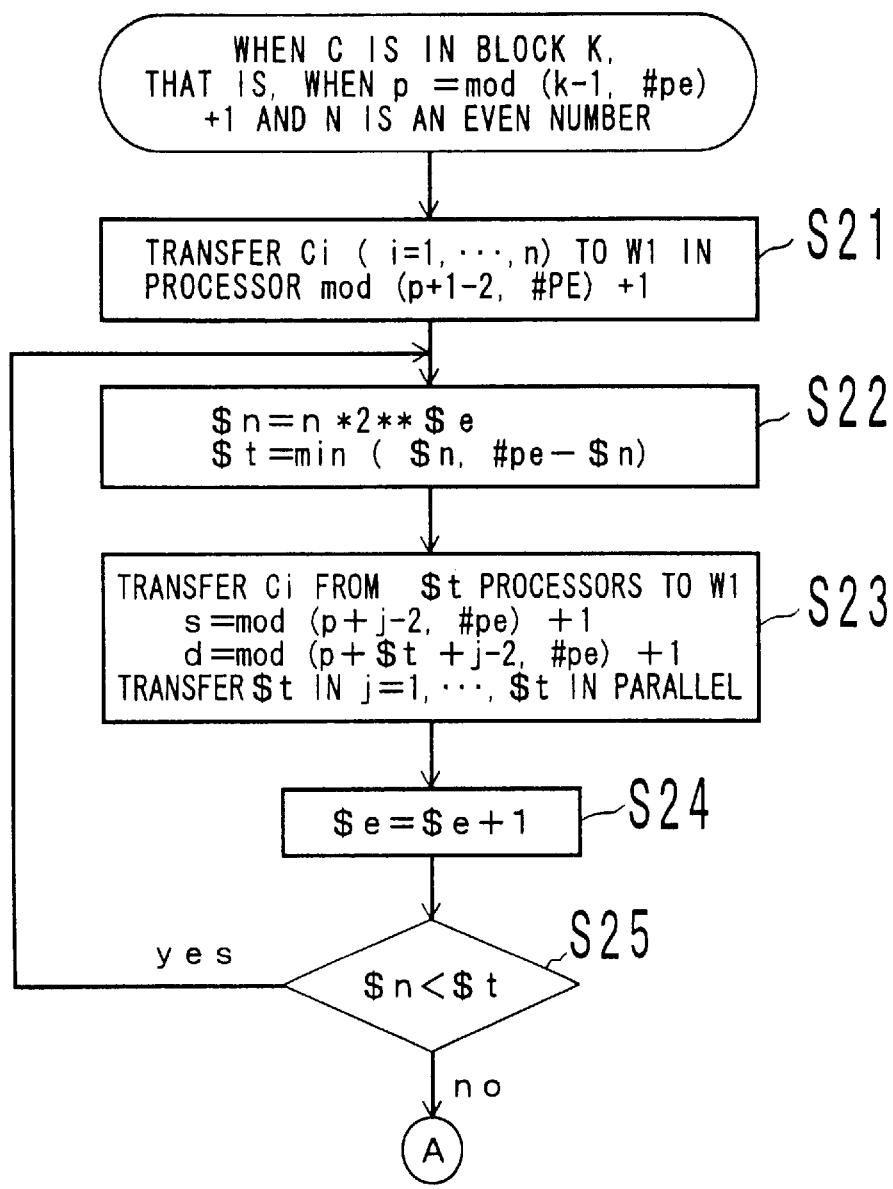
FIG. 10 is a flowchart (1) showing transfer of data and the calculation of a matrix product.
Figure 11:
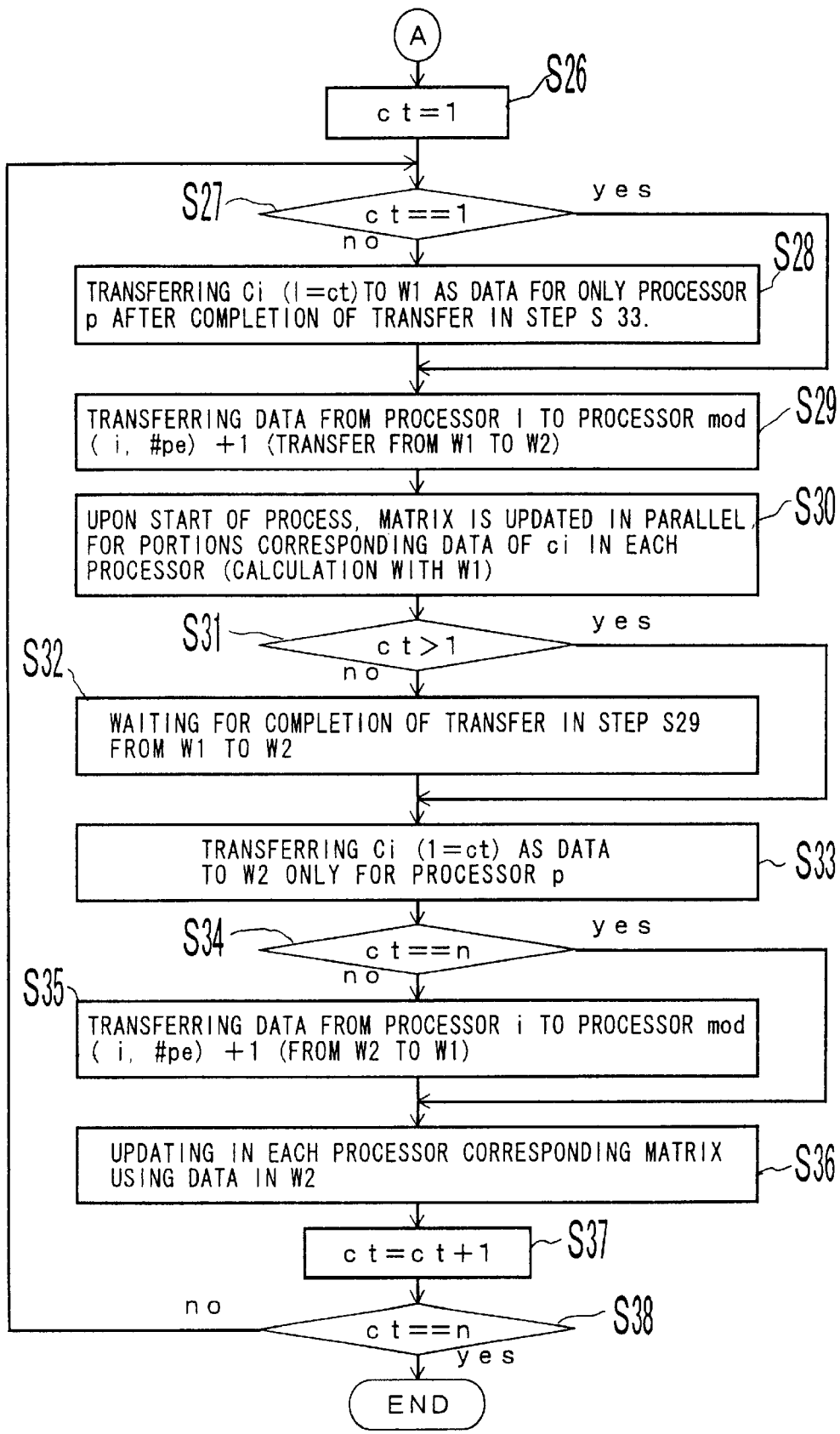
FIG. 11 is a flowchart (2) showing transfer of data and the calculation of a matrix product.

FIGS. 10 and 11 are flowcharts showing the case in which matrix C is in the k-th block, that is, located in processor p=mod (k−1,#pe)+1 and the divisor n of matrix C is an even number. In the flowcharts shown in FIGS. 10 and 11, the first calculation, that is, the calculation for the time of an odd number, is performed using the first work area (W1), while the calculation for the time of an even number is performed using the second work area (W2).

First, in step S21, Ci (i=1, . . . , n) is transferred to work area W1 of processor mod (p+i−2, #pe)+1 with $e set to 0.

In step S22, $n=n*2**$e and $t=min ($n, #pe−$n). min indicates a function for a minimum value.

In step S23, Ci is transferred from $t processors to work area W1. Then, on condition that s=mod (p+j−2, #pe)+1, $t pieces of data j=1, . . . , $t is transferred in parallel from processor s to processor d.

In step S24, data is processed based on equation $e=$e+1.

In step S25, it is determined whether or not $n<$t. If yes, control returns to step S22. If not, control is passed to the process in step S26 (FIG. 11).

In step S26, 1 is assigned to ct.

In step S27, it is determined whether or not ct==1, that is, ct indicates 1. If yes, control is passed to step S29. If not, the process in step S28 is performed.

In step S28, Ci (i=ct) is transferred as data to work area W1 to processor p only after the termination of the process in step S33.

In step S29, data is transferred from processor i to processor mod (i, #pe)+1 (from W1 to W2).

Figure 18:
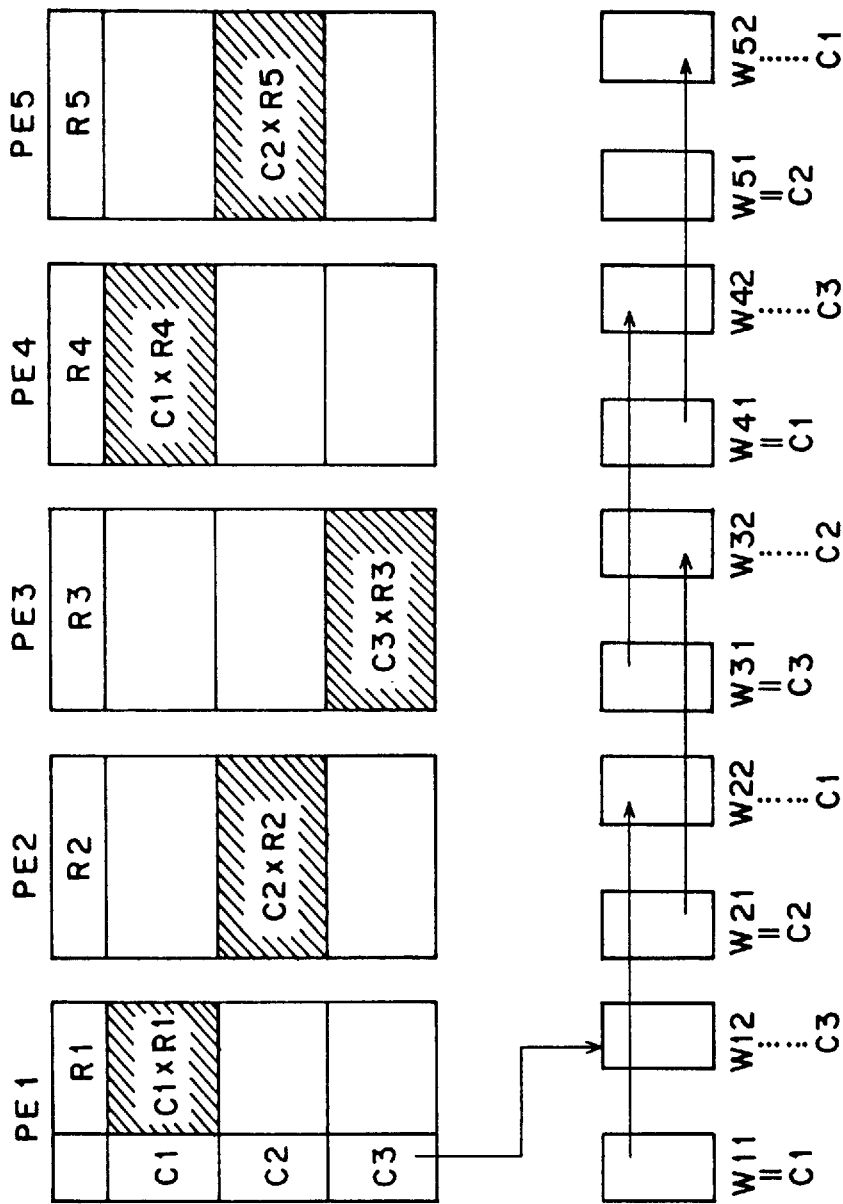
FIG. 18 is a diagram showing the calculation of a matrix product and the transfer of data in each processor.

In step S30, matrix is updated for the portions in parallel corresponding to the data of Ci in each processor (using W1). The contents of the processes in steps S29 and S30 are explained concretely below. For example, the example shown in FIG. 18 is processed as follows with the divisor n of matrix C set to 3, and the number of processors pe set to 5.

In the process in step S29, processor PE1 is assigned mod (1,5)+1=2 and the data in work area W1 in processor PE1 is transferred to work area W2 in processor PE2. Processor PE2 is assigned mod (2,5)+1=3 and the data in work area W21 in processor PE2 is transferred to work area W32 in processor PE3.

Likewise, in the process in step S30, a matrix product of C1×R1 is calculated using C1 stored in work area W1 in processor PE1, and a matrix product of C2×R2 is calculated using C2 stored in work area W21 in processor PE2. Thus, a matrix product of C3×R3 is calculated in PE3, a matrix product of C1×R4 is calculated in PE4, and a matrix product of C2×R5 is calculated in processor PE5.

Since data is transferred and a matrix product is calculated in matrix C simultaneously in parallel in each processor, the calculation time and data transfer time can be greatly shortened.

In step S31, it is determined whether or not ct>1. If yes, control is passed to the process in step S33. If not, the process in step S32 is performed.

In step S32, the termination of the process in S29 (transfer from W1 to W2) is awaited.

In step S33, data is processed based on equation ct=ct+1, and C1 (i=ct) is transferred as data to work area W2 for only processor p. In the process in step S33, next element Ci (i=ct+1) of matrix C is transferred as data for use in a subsequent operation to work area W2 of processor p.

In step S34, it is determined whether or not the value of ct has become equal to the divisor n of matrix C. If yes, control is passed to the process in step S36. If not, process in step 35 is performed.

In step S35, data is transferred from processor i to processor mod (i, #pe)+1 (from W2 to W1).

In step S36, the matrix corresponding to the data in work area W2 is updated in each processor in parallel.

In step S37, data is processed based on ct=ct+1.

In step S38, it is determined whether or not ct>n. If yes, the process terminates. If not, control returns to the process in step S27.

Described above is the division of matrix C in the row direction. Likewise, matrix C can be divided in the column direction. Considering the balance between parallelism and vectorization, the division in the row direction is more desirable because of the block width with an appropriate vector length.

As compared with the transfer in which the entire matrix is transmitted to each PE by the binary tree method taking the transfer time of ~LOG 2 (#pe), the above described method takes ~1-(LOG2 (#pe/n))/n. It refers to a very high-speed process when the #pe value is large.

[3] Method of parallel forward/backward assignment

The forward/backward assignment performed after the LU decomposition also requires parallelism for a high-speed process. The parallelism can be realized as follows.

Since the blocks are cyclically assigned to each PE at the LU decomposition as shown in FIG. 6, the original assignment method is restored. Then, the division in the column direction is altered to the arrangement of data divided in the row direction, and the forward/backward assignment is performed in parallel based on the arrangement.

That is, when the LU decomposition is performed, the column vector is distributed to each PE as shown in matrix A in FIG. 12. The arrangement is altered into matrix B shown in FIG. 12B so that the forward/backward assignment can be performed in parallel to arrange row vector in each PE. This process is performed in parallel and the data is entirely rearranged.

To rearrange the data in parallel, the matrix is divided along the boundary of distribution to each PE as shown in FIG. 13, to satisfy the following equation.

$$A=(a_{ij})[i=1,\ldots,\#pe, j=1,\ldots,\#pe]$$

where #pe indicates the number of processors. FIG. 13 shows the case where the number of processors #pe is 5.

Data is transferred for rearrangement between matrix A in which column vector is assigned to each PE and matrix B having an equal size in which row vector is assigned to each PE. The data is transferred for the block elements arranged in the diagonal direction as shown as hatched portions in FIG. 13.

As described above, the memory-distributed parallel processor according to the present embodiment shown in FIG. 3 allows a reading operation and a writing operation to be simultaneously performed for each processor.

Figure 14:
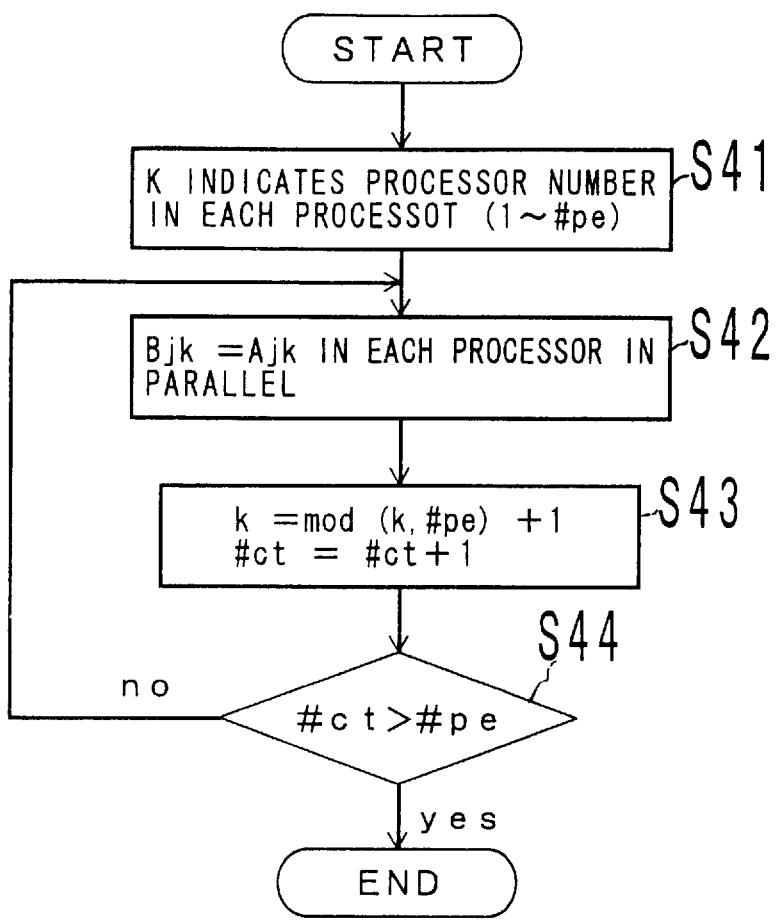
FIG. 14 is a flowchart of the rearrangement in the forward/backward assignment process.

FIG. 14 is a flowchart showing the conversion from matrix A to matrix B shown in FIG. 12.

In step S41 shown in FIG. 14, each processor (1~#pe) is represented by k=processor number, j=k, and #ct=1.

In step S42, data of Bjk=Ajk is rearranged in parallel in each processor.

In step S43, k=mod (k, #pe)+1, #ct=#ct+1.

In step S44, it is determined whether or not #ct>#pe. If yes, the process terminates. If not, control returns to the process in step S42.

Figure 15:
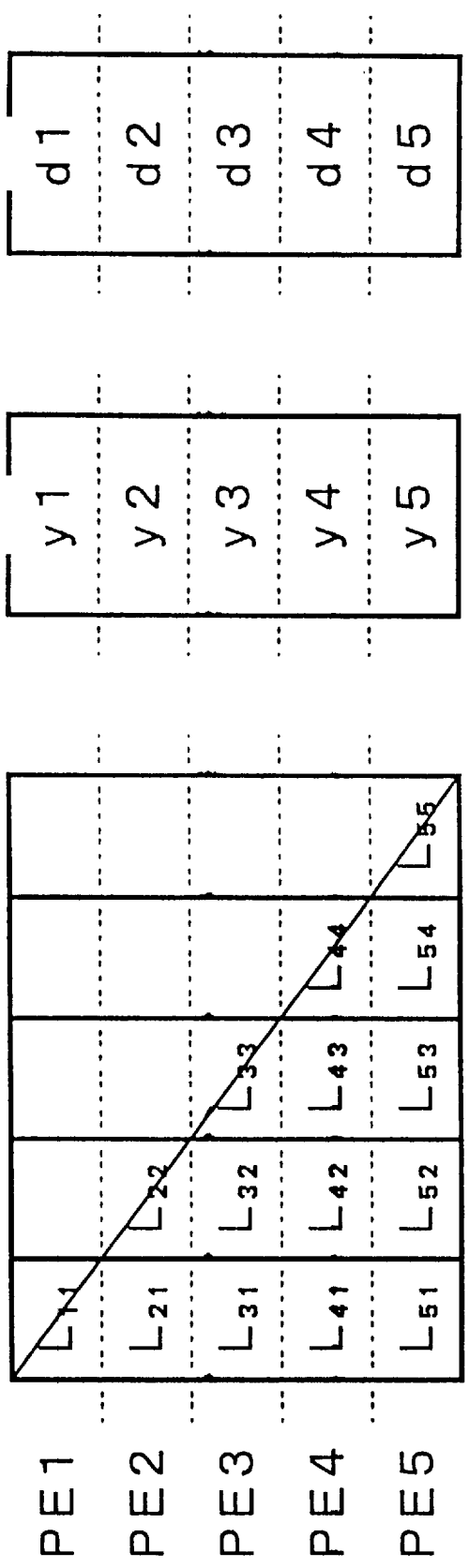
FIG. 15 is a diagram showing the forward/backward assignment process.

Matrix B is divided in the row direction as shown in FIG. 15. Assuming that matrix B is LU decomposed, LUx=d is solved and then Ly=d and Ux=y are sequentially solved. To perform the processes in parallel, each PE contains d, x, and y. Ux=y can also be solved likewise. Therefore, Ly=d is explained below.

First, equation $L_{11} \times y1=d1$ is solved in PE1. y1 in PE1 is transferred to y1 in variable y in each processor in the form of an exponent to 2. In (#pe-1) PEs, operations are processed based on di=di-$L_{i1} \times$y1 (where i=2, . . . , #PE).

Likewise, equation $L_{22} \times y1=d1$ is solved in PE2. y2 in PE2 is transferred to y2 in variable y in each processor in the form of an exponent to 2. In (#pe-2) PEs, operations are processed based on di=di-$L_{i2} \times$y2 (where i=3, . . . , #PE).

Likewise, equation $L_{kk} \times yk=d1$ is solved in PEk.

yk in PEk is transferred to yk in variable y in each processor in the form of an exponent to 2. In (#pe-k) PEs, operations are processed based on di=di-$L_{k2} \times$yk(where i=k, . . . , #PE).

Finally, after solving $L_{55} \times y5=dr5$, y5 is transferred to y5 in variable y in each processor in the form of an exponent to 2.

Obtained as a result is solution y for each processor.

Then, an application example of the present invention is explained in detail by referring to an example of solving the matrix of 200×200 by 5 processors. The block width of 10 is assumed. That is, a total of 20 blocks form a matrix.

If the matrix is allotted to each of five PEs, the number of blocks allotted to each PE is 4 (20 blocks÷5). These processors PE1 through PE5 are sequentially assigned block 1, block 2, block 3, . . . , block 20 in four block units.

Figures 16A, 16B:
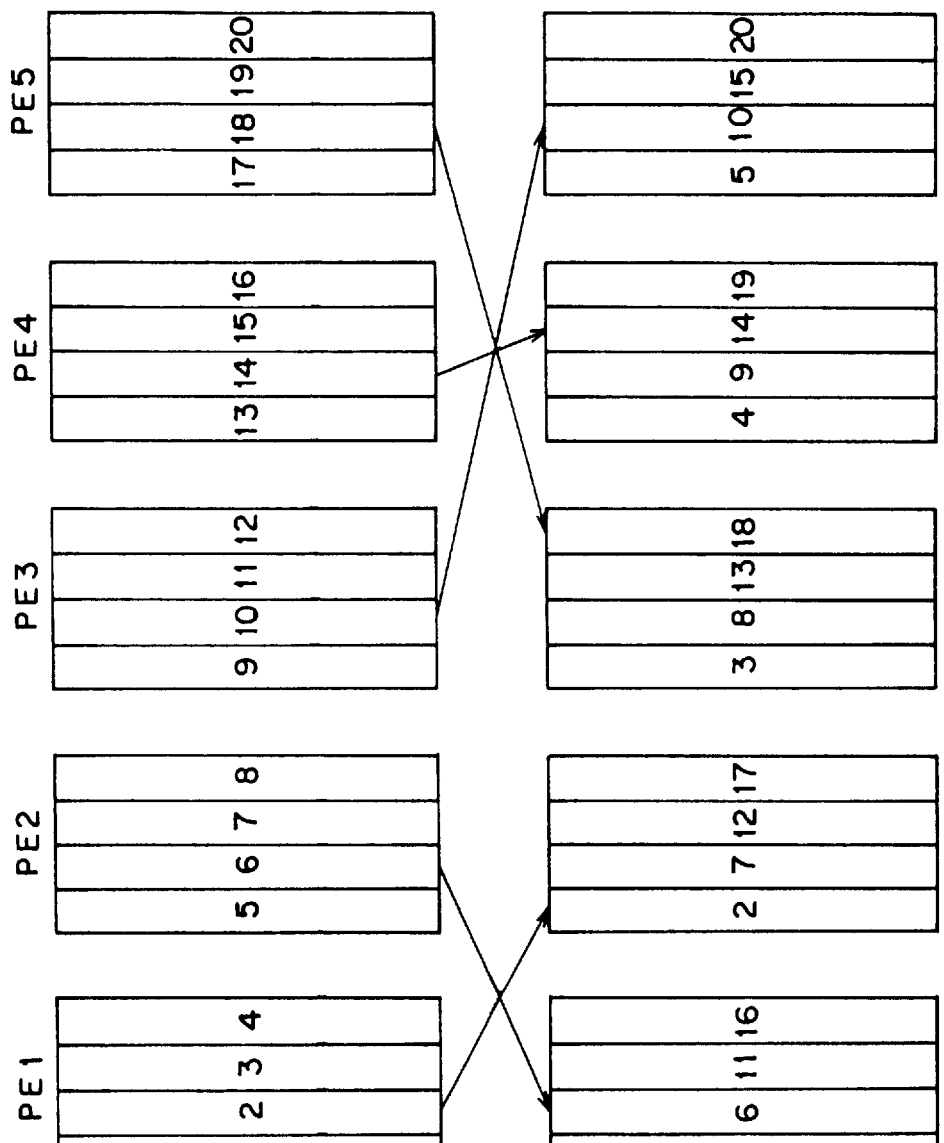
FIG. 16 is a diagram showing the rearrangement of data.

The data arranged as shown in FIG. 16A is rearranged as shown in FIG. 16B to equally allotting the portions to be processed in parallel. In FIG. 16B, the blocks are rearranged cyclically. In this rearrangement, for example, blocks 2, 6, 10, 14, and 18 are transferred simultaneously to realize parallel transfer such that a reading operation and a writing operation are simultaneously performed in each PE.

As a result of the rearrangement, the matrix in PE1 is the sequence of blocks 1, 6, 11, and 16 as shown in FIG. 16. Likewise, the matrix in PE2 is the sequence of blocks 2, 7, 12, and 17. The matrix in PE3 is the sequence of blocks 3, 8, 13, and 18. The matrix in PE4 is the sequence of blocks 4, 9, 14, and 19. The matrix in PE 5 is the sequence of blocks 5, 10, 15, and 20.

First, block 1 is LU decomposed. Block 1 (b1 in FIG. 17) is calculated in PE1 only. The hatched portion shown in FIG. 17 shows complete calculation.

Figure 17:
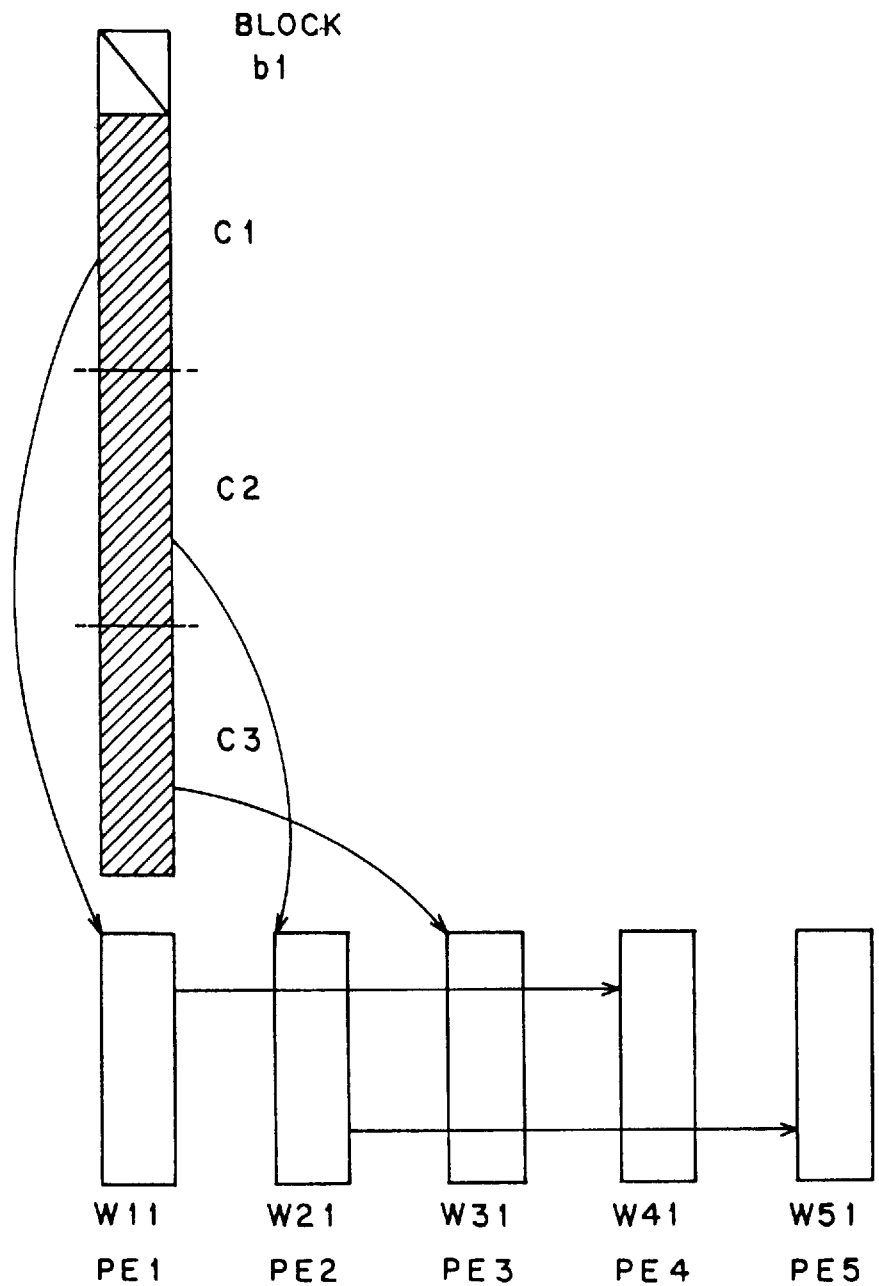
FIG. 17 is a diagram showing the transfer of block b1.

FIG. 17 shows the relation between block b1 and a work area in each PE to which each block is transferred. Each PE has first and second work areas. The first and second work areas of PE1 are W11 and W12 respectively. Those of PE2 are W21 and W22 respectively. Those of PE3 are W31 and W32 respectively. Those of PE4 are W41 and W42 respectively. Those of PE5 are W51 and W52 respectively.

FIG. 17 shows the hatched block b1 equally divided into C1 through C3. When the calculation is completed on these portions, C1 is transferred to W11 in PE1, C2 to W21 in PE2, and C3 to W31 in PE3. Based on the transfer, the data in W11 (C1) is transferred to W41 in PE4, and the data W21 (C2) is transferred to W51 in PE5 in parallel.

First, the calculation of a matrix product is made using Ci stored in the first work area (W11, W21, W31, W41, and W51) in each PE. Calculations are made first on the hatched portions shown in FIG. 18. Matrix product of C1×R1 is calculated in PE1. Matrix product of C2×R2 is calculated in PE2. Matrix product of C3×R3 is calculated in PE3. Matrix product of C1×R4 is calculated in PE4. Matrix product of C2×R5 is calculated in PE5.

Concurrently, data are transferred in parallel from W11 to W22, from W21 to W32, from W31 to W42, from W41 to W52. Simultaneously, C3 of block b1 held in PE1 is transferred to W12.

Figure 19:
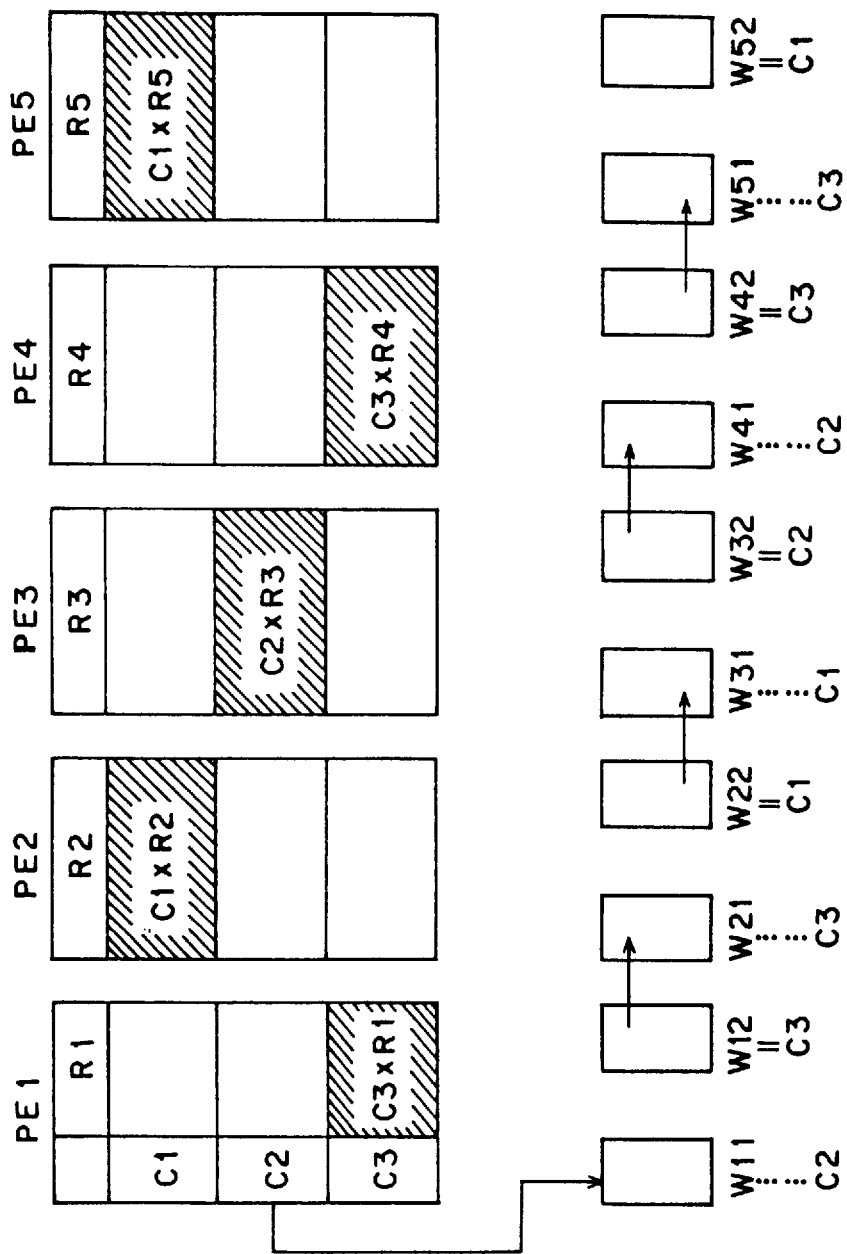
FIG. 19 is a diagram showing the calculation of a matrix product and the transfer of data in each processor.

Next, the calculation of a matrix product is made using Ci stored in the second work area (W12, W22, W32, W42, and W52) in each PE. Calculations are made first on the hatched portions shown in FIG. 19. Matrix product of C3×R1 is calculated in PE1. Matrix product of C1×R2 is calculated in PE2. Matrix product of C2×R3 is calculated in PE3. Matrix product of C3×R4 is calculated in PE4. Matrix product of C1×R5 is calculated in PE5.

Concurrently, data are transferred in parallel from W12 to W21, from W22 to W31, from W32 to W41, from W42 to W51. Simultaneously, C2 of block b1 held in PE1 is transferred to W11.

Figure 20:
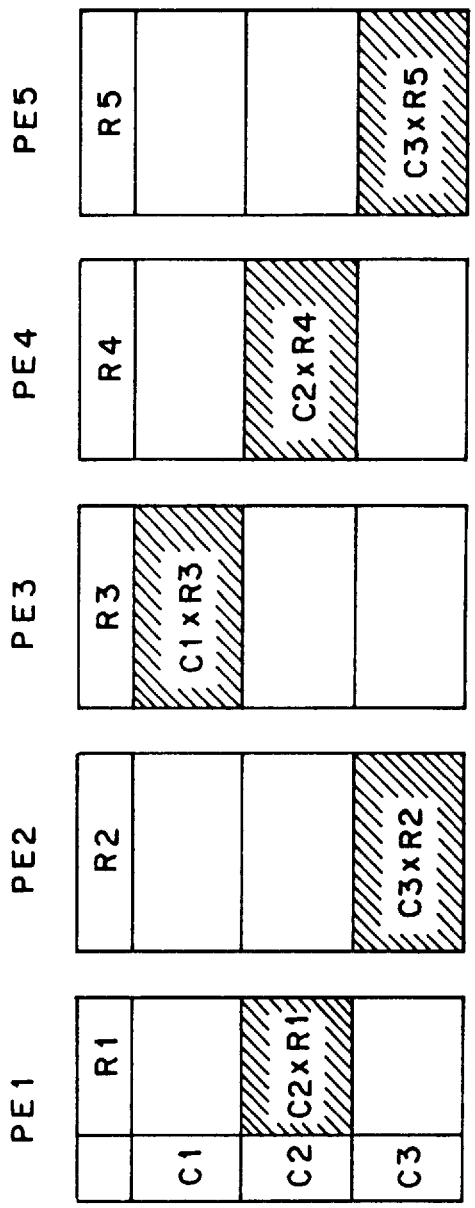
FIG. 20 is a diagram showing the calculation of a matrix product and the transfer of data in each processor.

In the third calculation, the calculation of a matrix product is made using Ci stored in the first work area (W11, W21, W31, W41, and W51) in each PE. Calculations are made first on the hatched portions shown in FIG. 20. Matrix product of C2×R1 is calculated in PE1. Matrix product of C3×R2 is calculated in PE2. Matrix product of C1×R3 is calculated in PE3. Matrix product of C2×R4 is calculated in PE4. Matrix product of C3×R5 is calculated in PE5.

Figure 21:
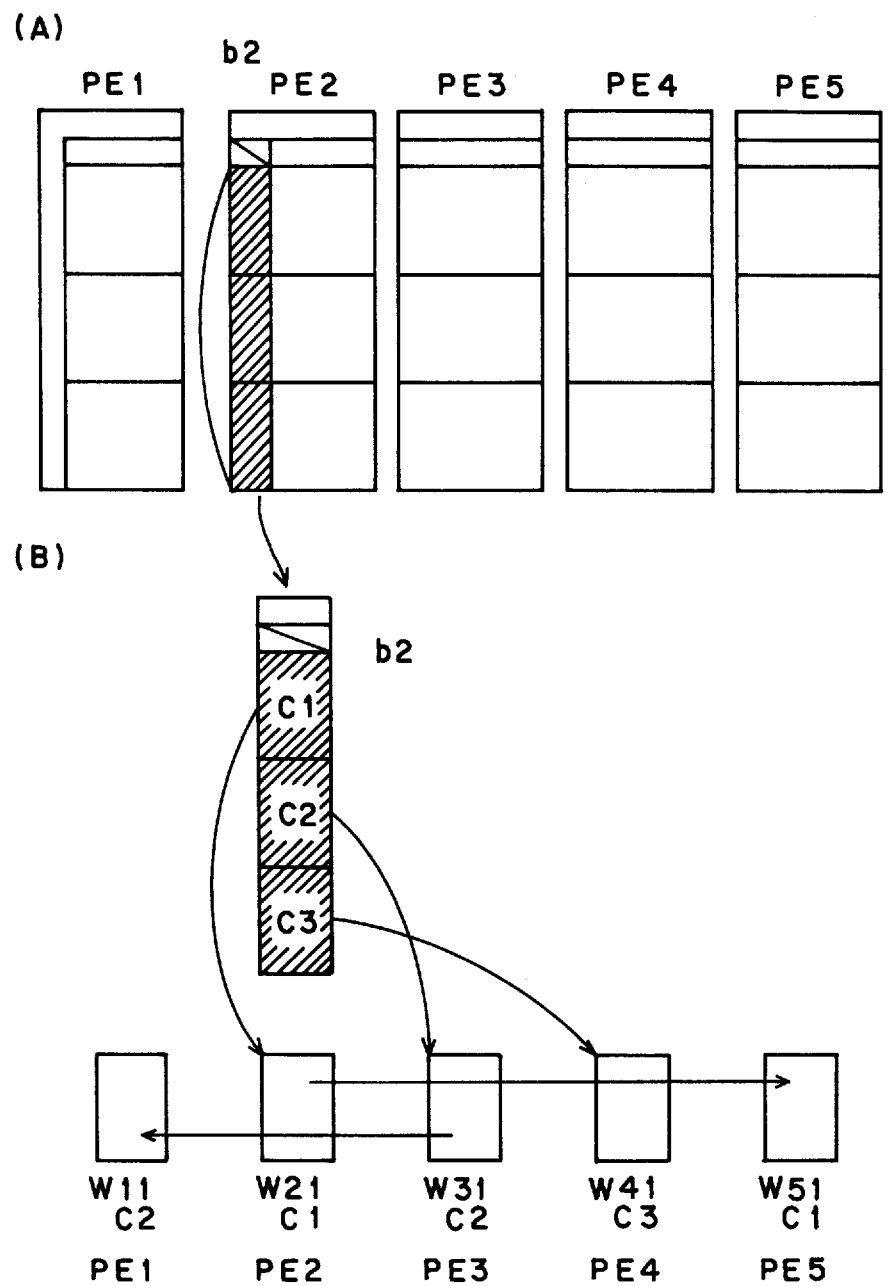
FIG. 21 is a diagram showing the rearrangement of data.

The calculation of the matrix product corresponding to the LU decomposition of block 2 (b2 shown in FIG. 21) as shown in FIG. 16B can be made by LU-decomposing the hatched portion of PE2 shown in FIG. 21A and transferring the portion required in the calculation after equally dividing block b2 into 3 portions C1 through C3 as in block b1.

FIG. 21B shows the relation between block b2 and a work area in each PE to which each block is transferred. C1 is transferred to W21 in PE2. C2 is transferred to W31 in PE3. C3 is transferred to W41 in PE4. Based on the transfer, the data in W21 (C1) is transferred to W51 in PE5, and the data W31 (C2) is transferred to W11 in PE1 in parallel.

Figure 22:
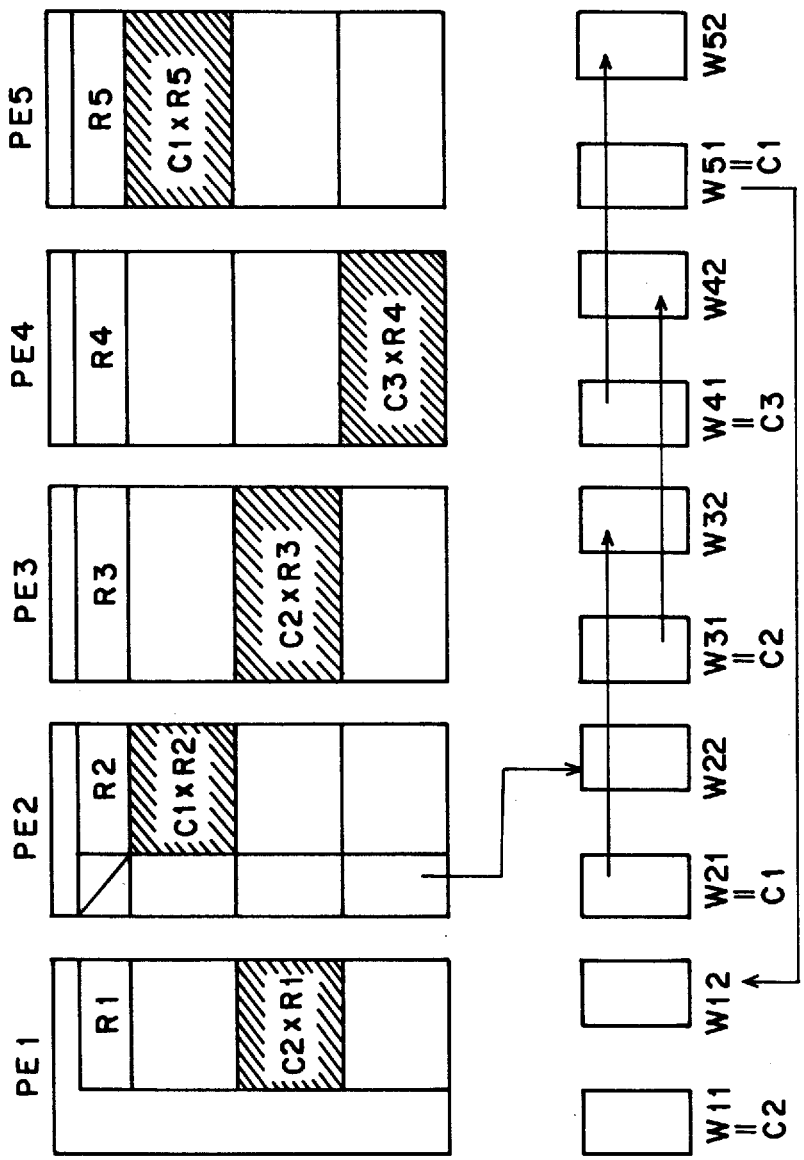
FIG. 22 is a diagram showing the calculation of a matrix product and the transfer of data in each processor.

Then, the calculation of a matrix product is made using Ci stored in the first work area (W11, W21, W31, W41, and W51) in each PE. Calculations are made on the hatched portions shown in FIG. 22. Matrix product of C2×R1 is calculated in PE1. Matrix product of C1×R2 is calculated in PE2. Matrix product of C2×R3 is calculated in PE3. Matrix product of C3×R4 is calculated in PE4. Matrix product of C1×R5 is calculated in PE5.

Concurrently, data are transferred in parallel from W21 to W32, from W31 to W42, from W41 to W52, from W51 to W12. Simultaneously, C3 of block b2 held in PE2 is transferred to W22.

Figure 23A:
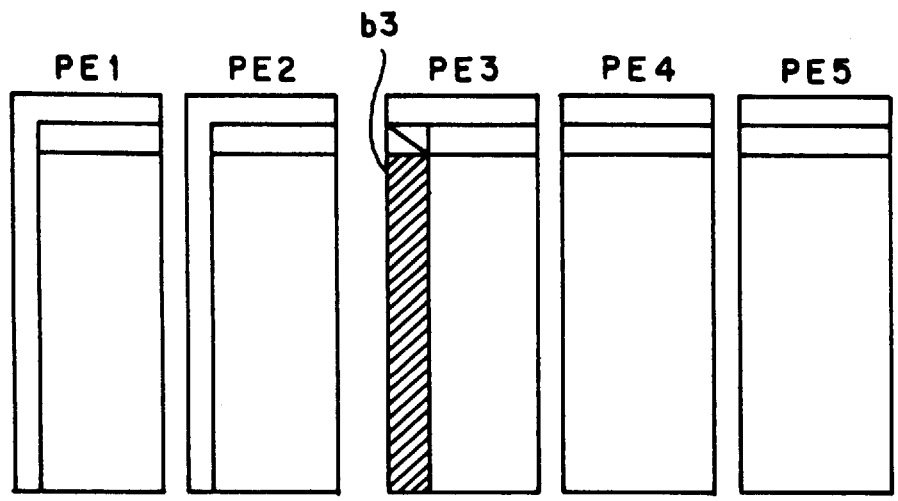
FIG. 23 is a diagram showing the rearrangement of data.
Figure 23B:
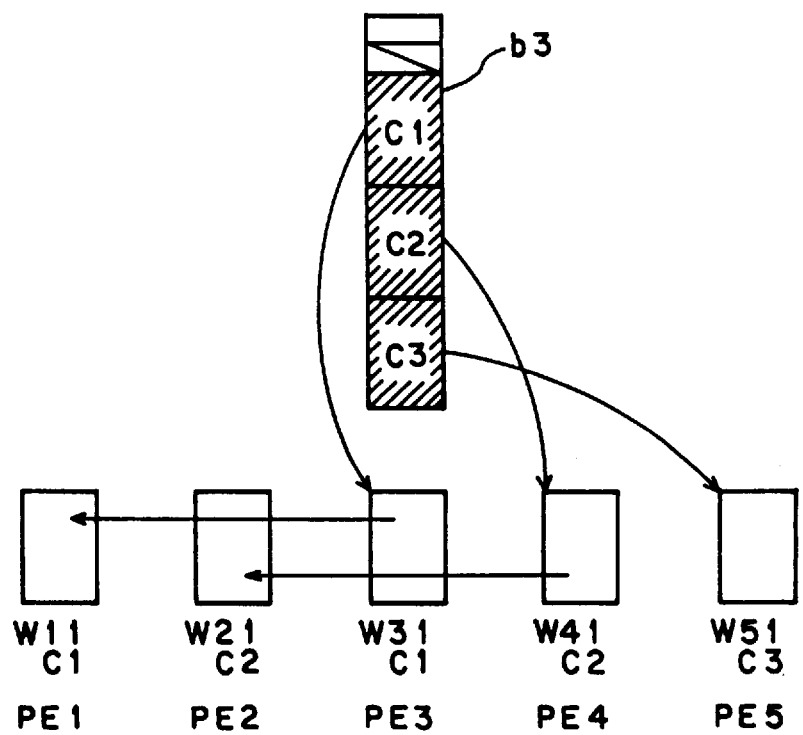

Data are calculated and transferred as in the case of block b1 described above by referring to FIGS. 19 and 20. When the calculation is completed on block b2, a matrix product is calculated corresponding to the LU decomposition of block 3 (b3 in FIG. 23) shown in FIG. 16B. After the LU decomposition of block b3 shown in FIG. 23A, block b3 is equally divided into 3 portions C1 through C3 as shown in FIG. 23B and transferred to the work area in each PE. Likewise, block b3 is calculated and transferred in the same way as described by referring to FIGS. 18 through 20. Thus, the subsequent blocks 4, 5, . . . , 20 are processed and the LU decomposition is completed.

Figures 24A, 24B:
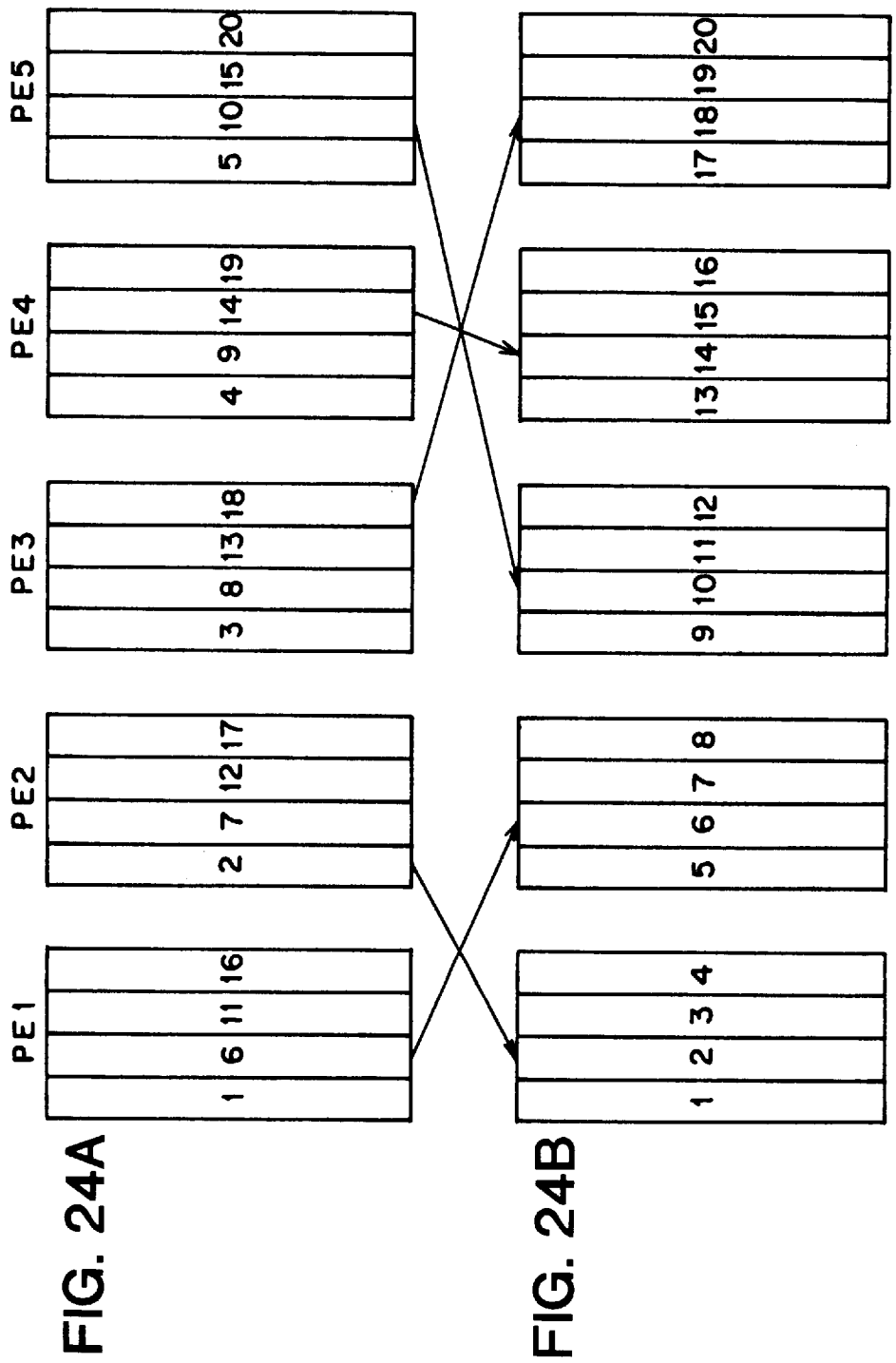
FIG. 24 is a diagram showing the rearrangement of blocks.

After the LU decomposition is completed on all blocks, the cyclically rearranged blocks are restored to the original arrangement. FIG. 24 shows an example of restoring the cyclically rearranged matrix as shown in FIG. 16 to its original arrangement. For example, blocks 2, 6, 10, 14, and 18 can be simultaneously transferred as shown by the examples from FIG. 24A to FIG. 24B.

Then, the data arranged in the column direction is rearranged in the row direction and processed in parallel in a forward/backward substitution.

Figure 25:
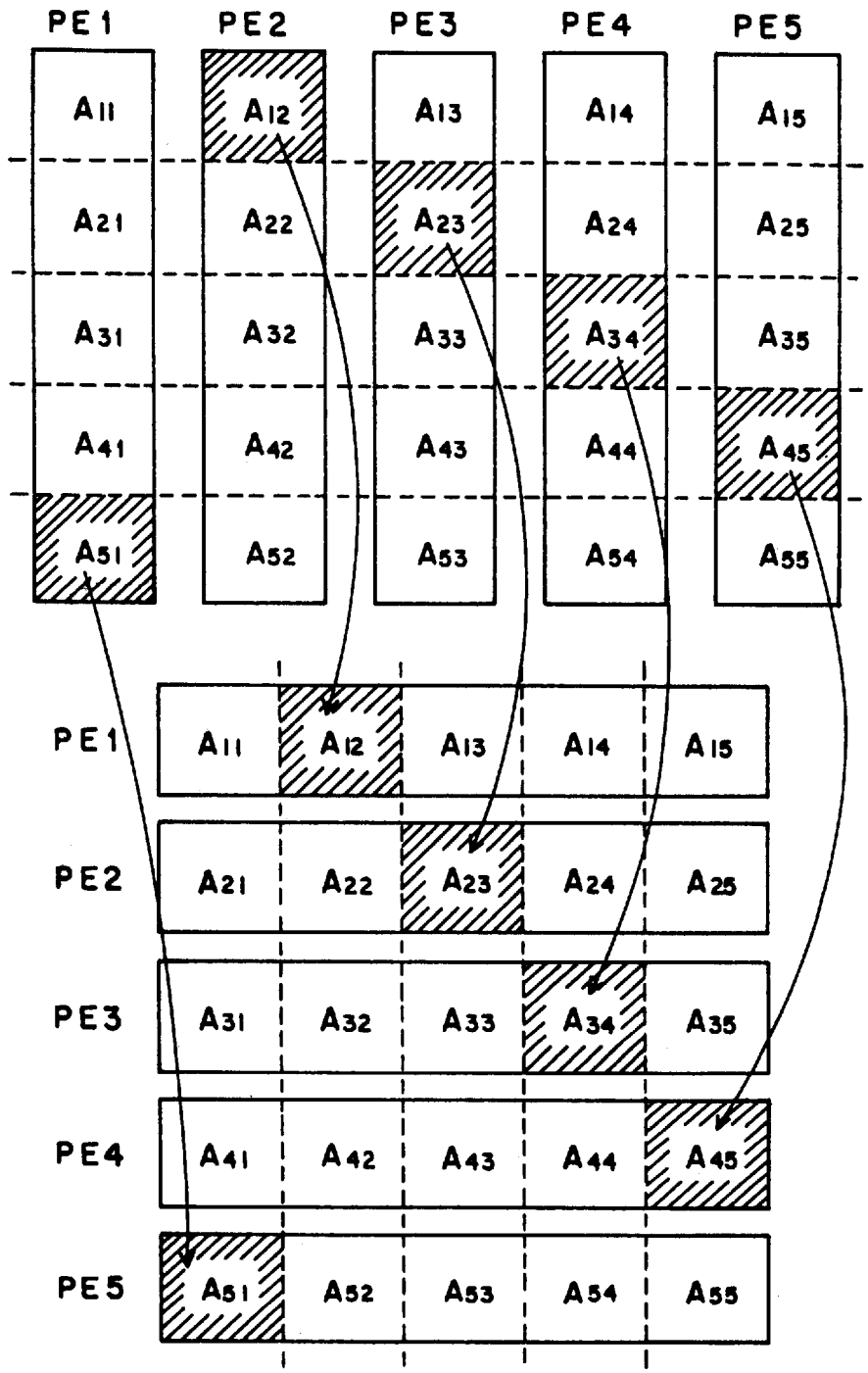
FIG. 25 is a diagram showing the rearrangement of blocks.

FIG. 25 shows an example of the rearrangement through parallel transfer based on the element blocks diagonally arranged in a matrix. The blocks are rearranged through parallel transfer performed such that $A_{51}$ in PE1 is transferred to the first area in PE5, $A_{12}$ in PE2 is transferred to the second area in PE1, and so on. If the rearrangement is completed after rearranging the blocks, then the forward/backward substitution is performed.

Figure 26:
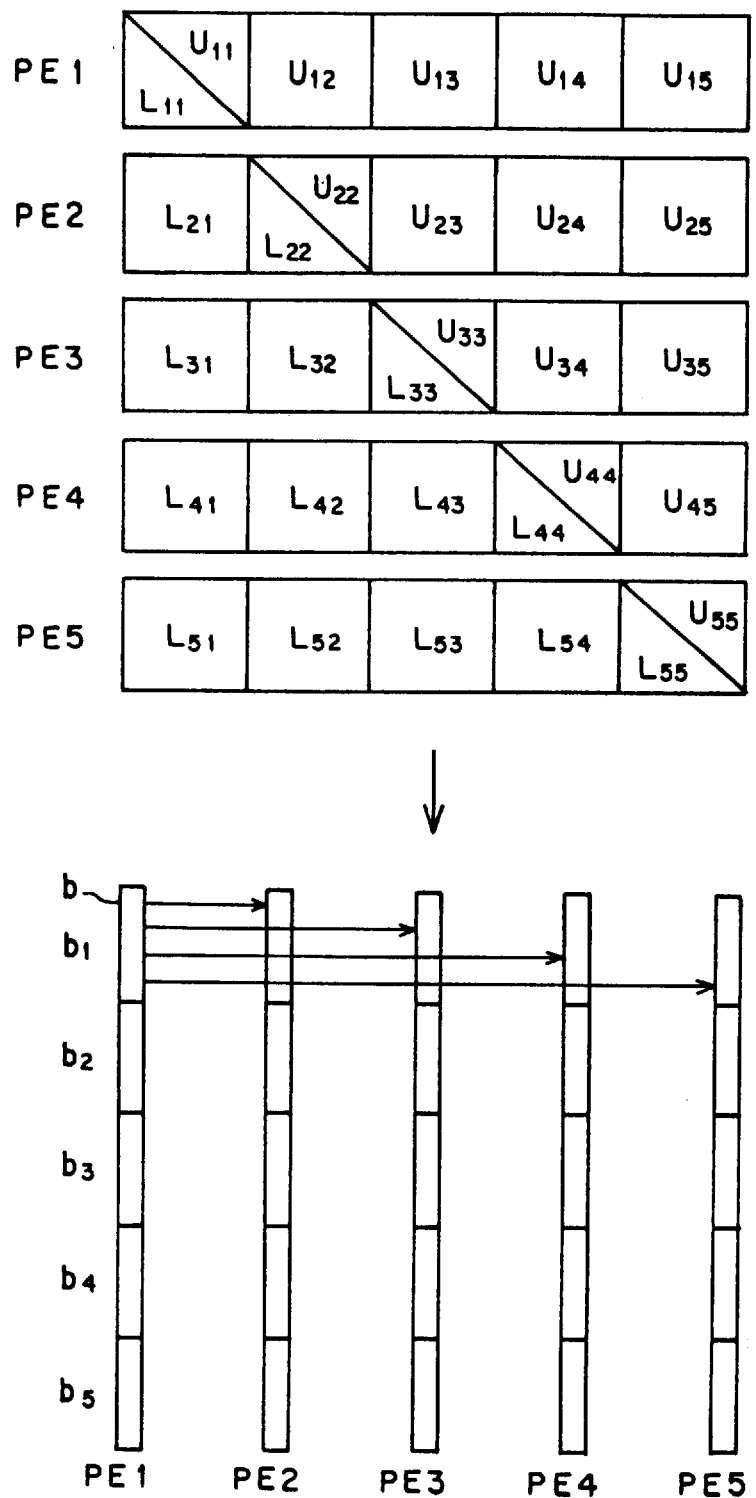
FIG. 26 is a diagram showing the relation between the matrix divided in the row direction and each processor.

FIG. 26 shows the relation between the matrix divided in the row direction and each PE. $b_1$, $b_2$, $b_3$, $b_4$, and $b_5$ are used to obtain a solution vector and stored in each PE individually. The calculation procedure is listed as follows.

(1) Solving $L_{11}X = b_1$ in PE1.
(2) $x_1$ is included in the area of $b_1$ and is transferred to each PE. $b_1 = x_1$
(3) Calculating $b_i = b_i - L_{i1} \times x_i$ in PEi where i>1.
(4) Then, solving $L_{22}x_2 = b_2$ in PE2 to obtain $x_2$.
(5) Transferring $x_2$ to each PE. $b_2 = x_2$
(6) Calculating $b_i = b_i - L_{i2} \times x_2$ in PEi where i>2.

Repeating the similar processes completes the forward substitution. A backward substitution is performed after the forward assignment.

As described above, the following effect can be obtained from the present invention.

1. Dynamically rearranging data allows portions to be processed in parallel to be equally allotted to each of the processors, thereby improving the efficiency in a parallel process. The actual performance of calculating a matrix, equally divided in the column direction, for the portion of an LU-decomposed matrix product obtained based on the Gauss' Method of elimination performed in block units using the outer products is approximately 65% of the performance of hardware. The performance is lowered due to low parallelism from the reduced number of assigned processors when the calculation process proceeds with a reduced update portion for the matrix product.

On the other hand, cyclically dividing data, that is, assigning a number i to each of blocks of column vectors and allotting the i-th block to the (mod (i−1, #pe)+1)th processor (where #pe indicates the number of processors), attains the actual performance of approximately 90–95% of hardware performance.

2. In calculating a matrix product, the data required to calculate the matrix product is divided, transferred, and calculated. According to the present invention, most transfer processes can be concurrently performed with calculation processes, and the initial transfer period during which transfer processes cannot be performed concurrently with calculation processes refers to apparent transfer time. The time required for the transfer processes can be considerably shortened through parallel processes compared with that required in the binary-tree method of transfer. As a result, the time required for the transfer of data necessary in calculating a simple matrix product to each processor in a binary-tree pattern is proportional to LOG2 (#pe). According to the present invention, the transfer time is 1+(LOG2 (#pe/#div) /#div) where the divisor of transferred data is #div. The second paragraph can be equal to or smaller than 0.5. Accordingly, the larger number of at least two processors indicate the higher efficiency.

3. Solving the forward/backward substitution as it is cannot utilize the parallelism of the forward/backward substitution because column vectors are in a single processor. Therefore, the cyclically arranged data is first restored to its original arrangement in equal divisions in the column vector direction, and then altered into the arrangement in equal divisions in the row vector direction. Thus, the forward/backward substituted data is processed in parallel, thereby considerably shortening the process time.

What is claimed is:

1. A method of simultaneously solving linear equations using a memory-distributed parallel processor including a plurality of processors capable of mutually transferring data, the method comprising the steps:

step a1 of dynamically rearranging column vector blocks of a coefficient matrix through parallel transfer such that the column vector blocks are cyclically distributed to each of the processors by transferring a k-th block k in the column vector blocks to a {mod (k−1, pe)+1} th processor where pe indicates a number of processors;

step a2 of LU-decomposing the column vector blocks arranged in each of the processors; and step a3 of performing a forward/backward assignment process on a result of the LU-decomposition.

2. The method according to claim 1, wherein
said step a1 transfers the column vector blocks in parallel so that a matrix product can be calculated in parallel in each of the processors when the coefficient matrix is LU decomposed.

3. The method according to claim 1, wherein said step a1 defines a plurality of column vectors in the coefficient matrix divided in a column direction and distributed to each of the processors as a single column vector block, and dynamically transfers the column vector blocks in parallel to each of the processors.

4. The method according to claim 1, wherein
said step a2 divides data to be processed in the matrix product calculation and transfers the data to each of the processors, and performs an LU-decomposition by repeating a matrix product calculation in each processor and a parallel transfer of divided data for use in a subsequent matrix product calculation to each processor.

5. The method according to claim 4, further comprising:
step b1 of restoring a matrix obtained as a result of the LU-decomposition to a state before a rearrangement of block units; and
step b2 of rearranging the data such that the data of the matrix divided in the column direction and distributed to each processor can be divided and distributed in a row direction, wherein
said step a3 performs the forward/backward assignment process using the matrix LU-decomposed, divided in the row direction and distributed to each processor in said steps b1 and b2.

6. The method, according to claim 1, wherein
said step a2 transfers any element in a matrix Ci to be used in an LU-decomposition operation in parallel to each of the processors when a matrix product calculation is performed in an LU decomposition, and performs the LU decomposition by repeating a process of simultaneously performing the matrix product calculation in each processor and transferring, in parallel, the matrix Ci to be used in a subsequent matrix product calculation.

7. The method according to claim 6, wherein
said step a2 divides the data to be processed in the matrix product calculation in the row direction, transfers a divided matrix Ci to one of a first area and a second area of each processor, and performs the LU-analysis by repeating the matrix product calculation in each processor on a transferred matrix Ci and a parallel transfer to the other area of the first and second storage area of each of the processors the matrix Ci used in a subsequent matrix product calculation.

8. A method of simultaneously solving linear equations using a memory-distributed parallel processor which includes a plurality of processors capable of mutually transferring data the method comprising:
dividing and transferring data in parallel, to be processed in a matrix product calculation, to each of the plurality of processors based on a dynamic rearrangement of block units of a coefficient matrix, LU decomposed into the block units, such that the block units are cyclically rearranged among the plurality of processors;
simultaneously performing a matrix product calculation in each of the processors on transferred data;
transferring divided data to be used in a subsequent matrix product calculation in parallel; and performing a forward/backward assignment process on a result of the LU decomposition.

9. A method of simultaneously solving linear equations using a memory-distributed parallel processor which includes a plurality of processors capable of mutually transferring data the method comprising:
dynamically rearranging data by transferring the data in parallel to each processor such that the data can be cyclically arranged in a plurality of column vector blocks in a coefficient matrix so as to perform a matrix product calculation in parallel in each processor during an LU decomposition;
dividing and transferring the data to be processed in the matrix product calculation to each processor when the coefficient matrix rearranged in block units is LU decomposed;
simultaneously performing the matrix product calculation in each processor on transferred data; and
transferring in parallel divided data to be processed in a subsequent matrix product calculation to each processor.

10. A memory-distributed parallel processor comprising:
a plurality of processors capable of mutually transferring data;
data rearranging means for dynamically rearranging a coefficient matrix, to be decomposed into LU, in a parallel transfer such that the matrix can be cyclically arranged in column vector blocks; and
LU decomposition means for dividing and transferring data to be processed in a matrix product calculation process to each of the processors when a matrix product calculation is performed in an LU decomposition, and for performing the LU decomposition by repeating a process of simultaneously calculating a matrix product in each processor on transferred data and transferring in parallel to each process divided data to be used in a subsequent matrix product calculation.

11. The memory-distributed parallel processor according to claim 10, further comprising:
forward/backward substitution means for restoring an LU-decomposed matrix to an original block arrangement, rearranging data in parallel in each processor from a matrix in which the blocks are equally divided in a column direction and distributed to each processor to another matrix in which the blocks are divided in a row vector direction and distributed to each processor, and performing a forward/backward substitution process in parallel in each processor based on the matrix rearranged in the row vector direction.

12. The memory-distributed parallel processor according to claim 10, wherein said data rearranging means rearranges the column vector blocks by transferring k-th block k in a matrix distributed to each processor to a {mod (k−1, pe)+1} th processor where pe indicates a number of processors.

13. The memory-distributed parallel processor according to claim 12, wherein
said LU decomposition means decomposes the data to be processed in the matrix product calculation process, transfers divided matrix Ci to each process, performs the LU-decomposition process by repeating a process of simultaneously calculating the matrix product in each processor on a transferred matrix Ci and transfers, in parallel, to each processor the matrix Ci to be processed in the subsequent matrix product calculation.

14. A method of simultaneously solving linear equations using a memory-distributed parallel processor including a plurality of processors capable of mutually transferring data, the method comprising the steps:

step a1 of dynamically rearranging column vector blocks of a coefficient matrix, distributed to memories of each of the processors, through parallel transfer between the memories such that the column vector blocks are cyclically distributed to each of the memories of each of the processors;

step a2 of LU-decomposing the column vector blocks arranged in each of the processors; and step a3 of performing a forward/backward assignment process on a result of the LU-decomposition.

15. The method according to claim 14, wherein said step a1 defines a plurality of column vectors in the coefficient matrix divided in a column direction and distributed to each of the processors as a single column vector block, and dynamically transfers the column vector blocks in parallel to each of the processors.

16. The method according to claim 14, further comprising:

step b1 of restoring a matrix obtained as a result of the LU-decomposition to a state before a rearrangement of block units; and step b2 of rearranging the data such that the data of the matrix divided in the column direction and distributed to each processor can be divided and distributed in a row direction, wherein said step a3 performs the forward/backward assignment process using the matrix LU-decomposed, divided in the row direction and distributed to each processor in said steps b1 and b2.

17. The method, according to claim 14, wherein said step a2 transfers any element in a matrix Ci to be used in an LU-decomposition operation in parallel to each of the processors when a matrix product calculation is performed in an LU decomposition, and performs the LU decomposition by repeating a process of simultaneously performing the matrix product calculation in each processor and transferring, in parallel, the matrix Ci to be used in a subsequent matrix product calculation.

18. A method of simultaneously solving linear equations using a memory-distributed parallel processor including a plurality of processors capable of mutually transferring data, the method comprising the steps:

dynamically rearranging column vector blocks of a coefficient matrix through parallel transfer such that the column vector blocks are cyclically distributed to each of the processors;

LU-decomposing the column vector blocks arranged in each of the processors; and performing a forward/backward assignment process on a result of the LU-decomposition.

19. The method according to claim 18, wherein said step of dynamically rearranging column vector blocks defines a plurality of column vectors in the coefficient matrix divided in a column direction and distributed to each of the processors as a single column vector block, and dynamically transfers the column vector blocks in parallel to each of the processors.

20. The method according to claim 18, further comprising:

a step of restoring a matrix obtained as a result of the LU-decomposition to a state before a rearrangement of block units; and a step of rearranging the data such that the data of the matrix divided in the column direction and distributed to each processor can be divided and distributed in a row direction, wherein said step of performing a forward/backward assignment process performs the forward/backward assignment process using the matrix LU-decomposed, divided in the row direction and distributed to each processor.

21. The method, according to claim 18, wherein said step of LU-decomposing the column vector blocks transfers any element in a matrix Ci to be used in an LU-decomposition operation in parallel to each of the processors when a matrix product calculation is performed in an LU decomposition, and performs the LU decomposition by repeating a process of simultaneously performing the matrix product calculation in each processor and transferring, in parallel, the matrix Ci to be used in a subsequent matrix product calculation.

\* \* \* \* \*

UNITED STATES PATENT AND TRADEMARK OFFICE
CERTIFICATE OF CORRECTION

PATENT NO. : 5,887,186
DATED : March 23, 1999
INVENTOR(S): Nakanishi

It is certified that error appears in the above-identified patent and that said Letters Patent is hereby corrected as shown below:

Col. 1, Equation (1), change "$L2^{(k)}-U2^{(k)}$" to --$L2^{(k)} \cdot U2^{(k)}$--.

Col. 8, line 24, change "W1" to --W11--;
line 30, change "W1" to --W11--.

Col. 9, line 55, after "PE1." BEGIN A NEW PARAGRAPH with "y1";
line 59, after "PE2." BEGIN A NEW PARAGRAPH with "y2".

Col. 11, line 62, after "PE." BEGIN A NEW PARAGRAPH with "$b_1$";
line 65, change "$L_{11}X=b_1$" to --$L_{11}X_1=b_1$--.

Col. 12, line 1, change "$x_i$" to --$x_1$--.

Col. 13, line 8, after "wherein" BEGIN A NEW PARAGRAPH with "said".

Col. 14, line 52, after "wherein" BEGIN A NEW PARAGRAPH with "said".

Signed and Sealed this

Twenty-sixth Day of October, 1999

Attest:

Attesting Officer

Q. TODD DICKINSON

Acting Commissioner of Patents and Trademarks